United States Patent [19]

Jensen

[11] Patent Number: 5,573,669
[45] Date of Patent: *Nov. 12, 1996

[54] METHOD AND SYSTEM FOR WATER PURIFICATION BY CULTURING AND HARVESTING ATTACHED ALGAL COMMUNITIES

[76] Inventor: Kyle R. Jensen, 1168 Woodland Ter. Trail, Altamonte Springs, Fla. 32714

[*] Notice: The term of this patent shall not extend beyond the expiration date of Pat. No. 5,527,456.

[21] Appl. No.: 399,204

[22] Filed: Mar. 6, 1995

Related U.S. Application Data

[63] Continuation-in-part of Ser. No. 893,246, Jun. 2, 1992.
[51] Int. Cl.$^6$ ............................................. C02F 3/32
[52] U.S. Cl. ..................... 210/602; 210/170; 210/241; 210/242.1; 47/1.4; 47/59; 56/8
[58] Field of Search ........................... 47/1.4, 59, 60, 47/65; 56/8, 9; 210/170, 241, 242.1, 242.3, 525, 527, 602, 778

[56] References Cited

U.S. PATENT DOCUMENTS

| | | | |
|---|---|---|---|
| 3,004,672 | 10/1961 | Conley et al. | 210/527 |
| 3,969,249 | 7/1976 | Dodd | 210/527 |
| 4,166,036 | 8/1979 | Barnhouser | 210/527 |
| 4,253,271 | 3/1981 | Raymond | 47/1.4 |
| 4,333,263 | 6/1982 | Adey | 47/1.4 |
| 4,813,997 | 3/1989 | Kinnersley et al. | 47/1.4 |
| 5,197,263 | 3/1993 | Midtling et al. | 210/242.3 |
| 5,254,252 | 10/1993 | Drenner | 210/602 |

*Primary Examiner*—Thomas G. Wyse
*Attorney, Agent, or Firm*—Allen, Dyer, Doppelt, Franjola & Milbrath, P.A.

[57] ABSTRACT

A floway for cleansing water of pollutants is presented that has an upstream weir wherein water to be cleansed is admitted, a downstream weir wherefrom water is discharged, and curbs extending between the weirs for retaining water along the sides. The bottom surface is specifically textured conducive for growing a bed of algae to form an algal turf thereon. The algae bioassimilates pollutants from the water and is harvested periodically by a vacuum system having a notched, rotating nozzle at the intake end. An ultraviolet reactor positioned at the downstream end is used to degrade volatile organic compounds. In addition, the water surface is disturbed to change the angle of incidence of light and focus additional light energy on the algae.

14 Claims, 23 Drawing Sheets

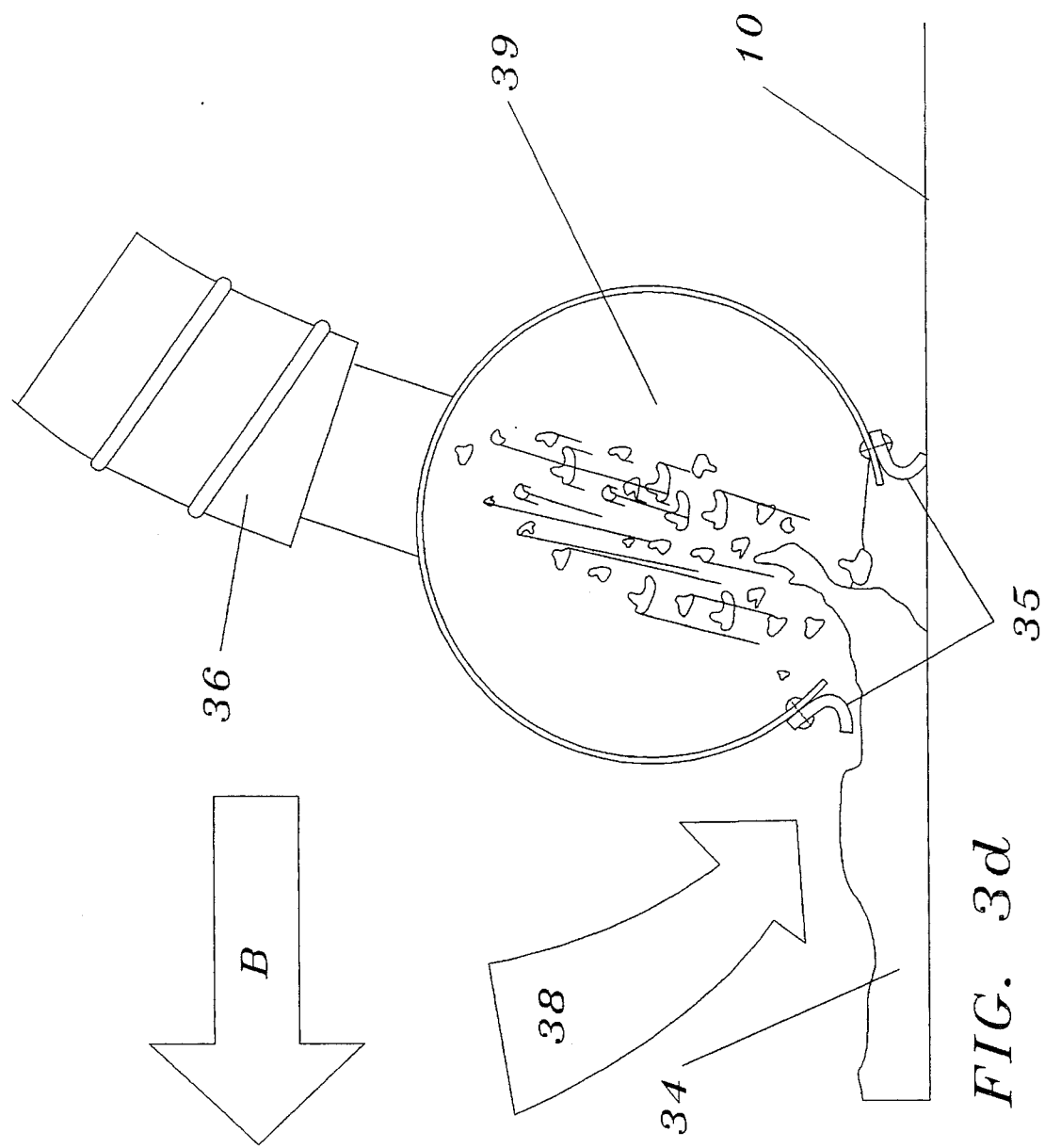

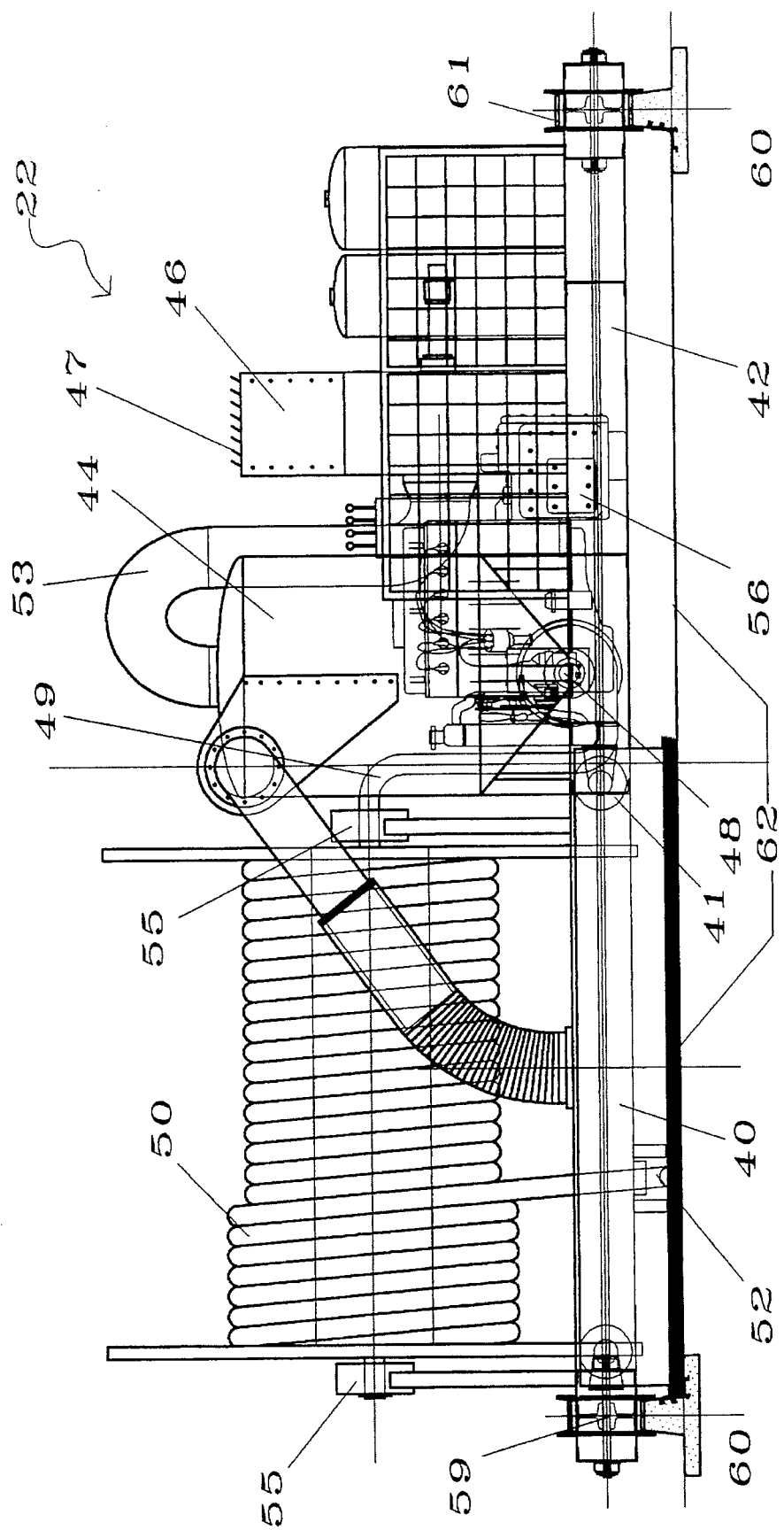

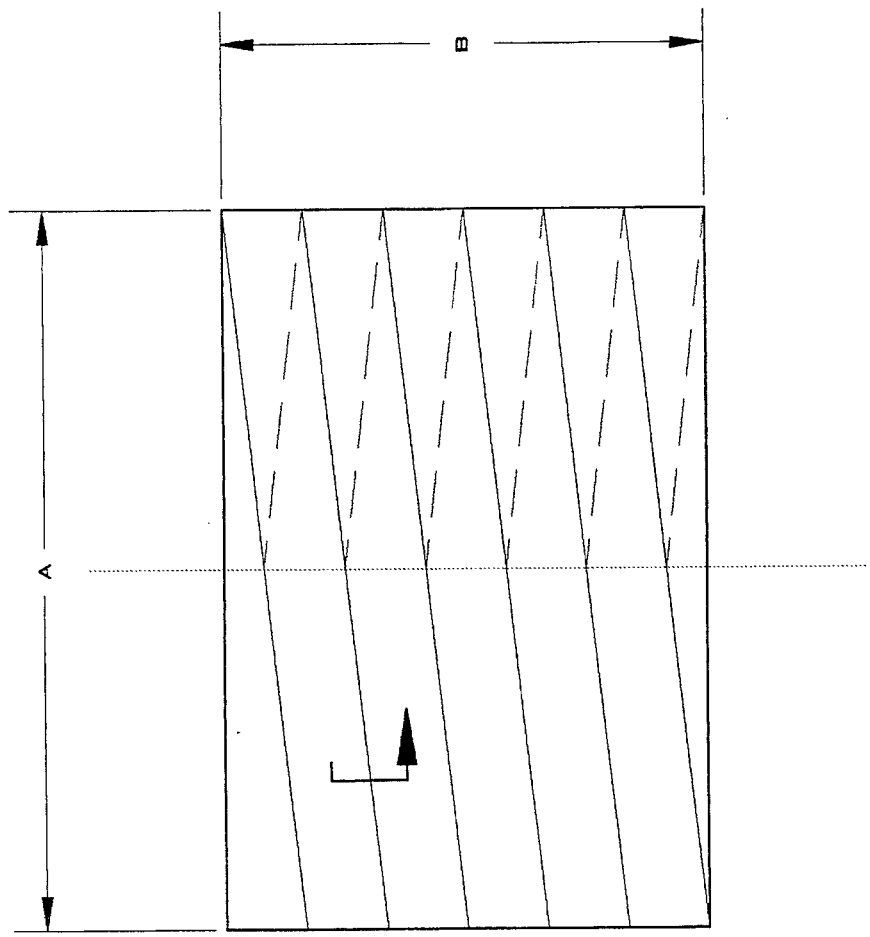
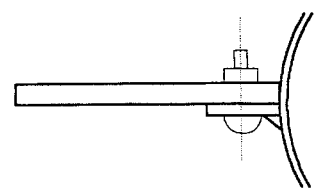
Fig. 6b

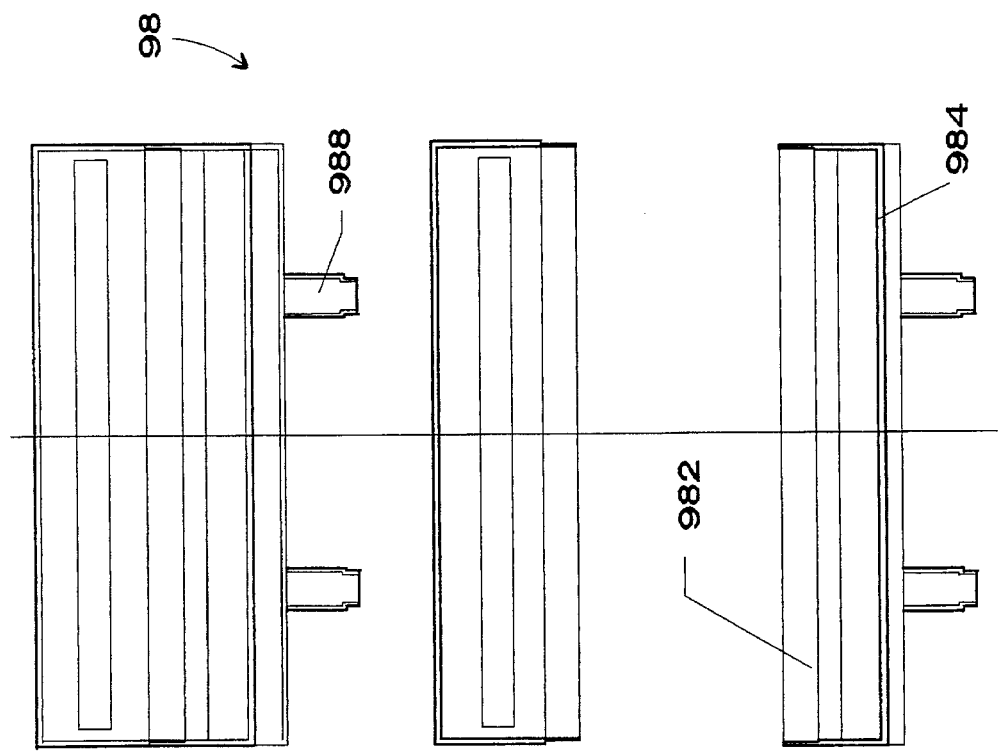

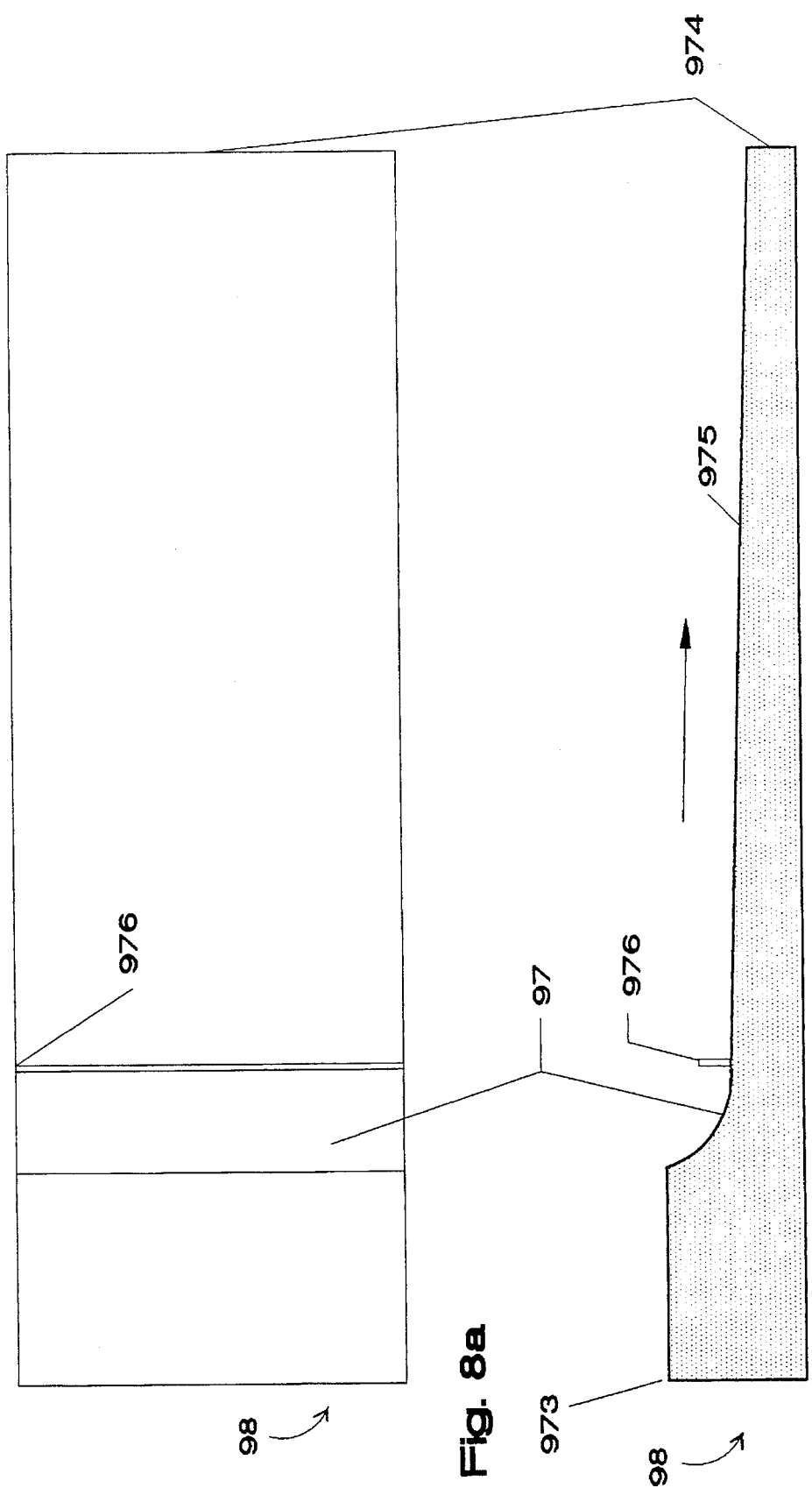

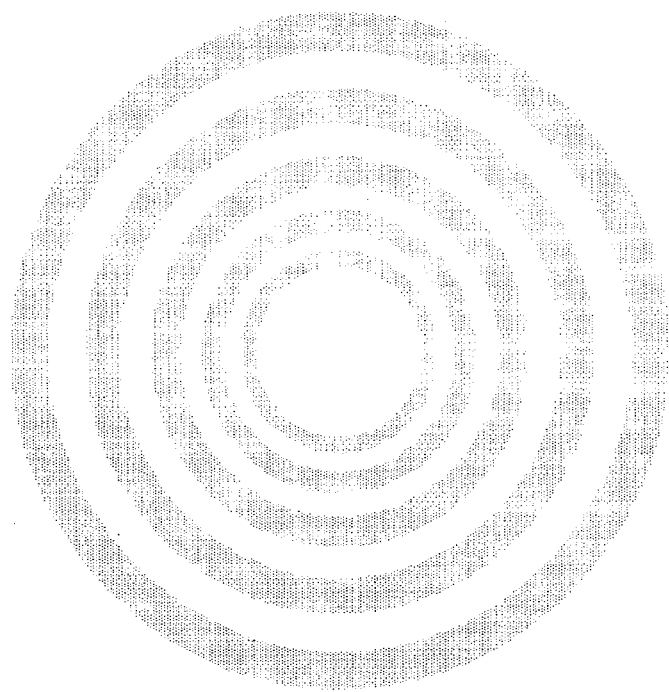
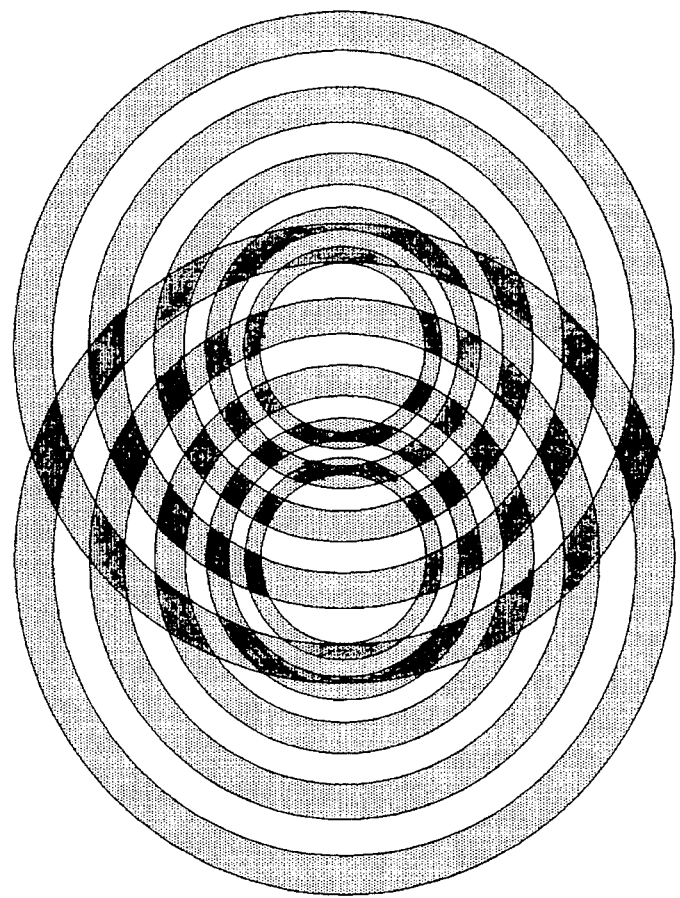
Fig. 12

METHOD AND SYSTEM FOR WATER PURIFICATION BY CULTURING AND HARVESTING ATTACHED ALGAL COMMUNITIES

CROSS-REFERENCE TO RELATED APPLICATION

This application is a contiuation-in-part of copending application "Method and Apparatus for Water Purification by Culturing and Harvesting Attached Algal Communities," Ser. No. 07/893,246, filed Jun. 2, 1992.

BACKGROUND OF THE INVENTION

The removal of chemical contaminants from wastewater and ground water has become an important problem in restoring ecological balance to polluted areas. It is known that some algal species are capable of absorbing heavy metals into their cell walls, thus reducing their toxic effects. Algae can also take up nutrients that may be present in overabundance, such as potassium and nitrogen, thus providing a remediating ecosystem. The system used to effect this uptake is known as algal turf. A further advantage to this technique is that the enriched algae can be harvested and used as animal feed, thus returning the nutrients to the food chain.

Algal turf can potentially be used for a variety of applications. For example, the turf can be used to replace the biological or bacteriological filters in aquaria. As mentioned above, algal turf can be used to remove nutrients and other contaminants from polluted waters. Finally, by harvesting the algal mass, various process technique can be used to produce biomass as an energy source such as methane or ethanol, as a fertilizer or as a human or an animal food additive or supplement, cosmetic or pharmaceutical.

Studies in algal turf production are known in the literature. For more than 20 years, tropical reefs have been acknowledged to be among the most productive of natural systems. For example, in Lewis, "Processes of Organic Production on Coral Reefs," pp. 305–347, 52 Biol. Rev. (1977), production values as found, for example, on p. 312 therein, indicate that coral reefs are among the highest producers in primary production values for pelagic, benthic, and terrestrial ecosystems.

Notwithstanding the values demonstrated in some earlier literature, recent efforts have demonstrated that those estimates of reef primary productivity were conservative. The mean reported value, 10.3 Gc/m$^2$/day should be contrasted to values ranging from 19.2 to 32.7 Gc/m$^2$/day in a 1980 study referring to St. Croix reefs. Such recent studies have demonstrated that algal turfs in conjunction with wave surge have been identified as the primary source of most reef productivity. The latest large-scale pilot plants in fresh water agricultural irrigation waters algal turf scrubbers or periphyton scrubbers with variable wave energies have repeatedly demonstrated production averaging 35 g/m$^2$/d with peaks well over 40 g/m$^2$/d.

Within this technology it has been known that the removal or severe reduction of wave surge motion can reduce primary productivity, subtle manipulation of sometimes very light wave energies of various patterns across the growing surface can fine tune the performance of periphyton filters or algal turf such that a desired speciation of algal turf can dominate, and thus specific forms of a particular pollutant can be more effectively removed. In some areas such as reef systems, a typical daily cycle of oxygen concentration in a reef microcosm can be greatly affected by wave surge action. Reef production is accurately measured only near oxygen saturation, since atmospheric exchange is a factor at higher or lower oxygen concentrations. When a wave generator used in such reef microcosm devices is stopped, given the same current, light, and nutrient levels, net productivity is nearly zero. The lack of an oxygen spike when the wave generator is restarted indicates that greatly reduced production is a real factor as opposed to an apparent condition because storage has not occurred.

Algal turf techniques have been disclosed in U.S. Pat. No. 4,333,263, issued to Adey, entitled "Algal Turf Scrubber," which issued Jun. 8, 1982, and the present inventor's U.S. Pat. No. 5,131,820, entitled "Low Pressure, Low Head Buoyant Piston Pump for Water Purification."

Additionally, within the reported research in this technology there is a body of literature dealing with algal techniques for waste recycling, oceanic farming, or the like. Contemporary research can be grouped in two distinct categories: those utilizing macro algae and those using planktonic algae. In the first group, macro algae reports dealing with waste recycling or the like can be found in Ryther et al., "Physical Models of Integrated Waste-Recycling Marine Polyculture Systems," Aquaculture, 5, 163–177 (1975); California Institute of Technology, Graduate School Project "Evaluating Oceanic Farming of Seaweeds As Sources of Organics and Energy, "U.S. Department of Energy, Division of Solar Technology, Contract E (04–3)-1275; and Washington State Department of Natural Resources, Project "Aquaculture of Seaweeds on Artificial Substrates," U.S. Department of Commerce, Contract R/A-12. In the case of planktonic algae, Goldman et al., "Relative Growth of Different Species of Marine Algae in Wastewater-Seawater Mixtures," Marine Biology, 28, 17–25 (1974); Karolinska Institute, "Investigation of an Integrated Aquatic System for Storing Solar Energy in Organic Material," Namnden for Energiproduktionforskning, No. 53 3065 062; and State of Hawaii Natural Energy Institute, "Energy from Algae of Bioconversion and Solid Waste," Hawaii State Government, demonstrate the status of contemporary research using that type of algae.

In either case, research to date has not utilized wave surge motion as discussed herein to enhance the exchange of metabolites between algal cells in the water medium. Also, these known research techniques have not recognized the criticality of macro algae size, vis-a-vis the shading of one cell by another. Accordingly, such techniques are not suitable for optimum biomass production, and the propensity of removing nutrients and other contaminants from polluted waters is severely limited.

Utilized in conjunction with this invention are micro algae of the major groups of benthic algae. In such algae, the use of attached algal turfs, wherein the simple algae all or most cells are photosynthetic, demands critical attention to wave surge motion. By optimizing such surge motion together with harvesting techniques, metabolite cellular-ambient water exchange is optimized, and continuous shading of one cell by an adjacent cell is prevented.

Algal turf growth can be achieved in an aqueous environment by providing a suitable vacant area in which spores may settle. The first colonizations are usually microscopic diatoms, which are then rapidly dominated by the turf species. In accordance with the present invention, the harvesting of such turfs must occur before they are overgrown in turn by the larger macroalgae or macrophytes. This keeps production rates at a high level and minimizes predation by grazing microorganisms. The rate of harvesting is dependent on light levels, temperature, water culture nutrient concentration, micronutrient concentration, and surge action. Immediate regrowth of the algal turf will occur if the vacant surface or substrate is sufficiently coarse to allow a filamentous base of the algae to remain following harvesting. Typically, such a substrate can be a plastic screen having screen grid dimensions in the range of approximately 0.5 to 5 mm, or other highly textured surfaces.

In the past, harvesting was accomplished by simply scraping the algae off the surface, but this often served incompletely to remove portions of the algae and allow these fragments and particles to be discharged into the water system, whereby the nutrients previously incorporated into plant mass or otherwise trapped were dislodged, decomposed, broken into small pieces, and flushed back into the waterway upon restart of process design flow rates. It was to improve upon the procedure of growing, harvesting, and processing the algae and other trapped particulates and organisms on a large scale (acres or more) and construction of facilities in an economical fashion, across various geological surfaces with low bearing pressures, which optimize growing conditions for the algal or paraphytic community and allow effective removal of bioassimilated or trapped pollutants after they have been taken up from the water, that the present invention was developed.

SUMMARY OF THE INVENTION

In accordance with this invention, a form of waterway is utilized, the bottom surface of which waterway is provided with a screen or other growing substrate conducive for growing a bed of algae to form an algal turf. This waterway is referred to as an algal turf floway, as it has a significantly longer flow distance and less wave surge action in some cases than in previously disclosed systems. The system elements permit a wide variety of algal turf or paraphytic communities with more flexible filtration capabilities than previously disclosed methods. By causing water from a lake, pond, river, or other waterway to flow over the algal turf, the water is cleansed to a sufficient degree that it can be reintroduced into the waterway in greatly improved condition.

A longer floway than used in previously disclosed systems is desirable in that it promotes a hitherto unrealized benefit, a precipitation process, to be exploited that does not occur naturally. Previously used systems relied primarily on bioassimilation of the algae to remove pollutants. During the growth cycle, the algae consume carbon, which is provided by decaying material, the supply of which is never exhausted. With a longer floway and repeated harvesting, decaying material is removed, and the algae utilize other sources of carbon, such as bicarbonate. This causes a rise in pH, which in turn causes a precipitation of phosphorus and other compounds from the water. Aeration or addition of water to be treated returns the pH to normal levels.

In the course of describing and claiming this invention, the term "algal turf" is to be construed not only as the filamentous algae, but the periphytic mat or community of matter that is allowed to or caused to exist with the filamentous algae. The latter includes but is not limited to: filamentous algae rooted by holdfasts on a surface; ephitic or clinging plants and animals that grow or are caused to grow from, or in the presence of, the filamentous algae, and the particulate matter trapped or otherwise detained in the course of manipulation of previously described elements; and/or all matter that can be removed from the floway via the harvesting process.

Another term used herein that is to be construed in a broad way is "mature algal turf." By mature algal turf is meant the algal turf at a time or range of times at which its production reaches a point where, owing to size, development, or other reasons, a significant portion of the community comprising the algal turf becomes unstable physically and is released from its attachment and moves undesirably from its captive growing area such that it cannot be harvested. In many instances, the algal turf matures in seven to fifteen days, but the invention is not intended to be limited to this number of days.

Another term utilized herein that is to be construed in a broad way is "sector." By sector is meant a lateral division of floway surface in its longest direction, whereby the algal turf of a selected longitudinal sector is harvested by means of laterally adjustable equipment. It is preferred that an even number of longitudinal sectors be selected on a floway such that travel both to and from a given point can accommodate the harvesting of algal turf.

Still another term that is to be construed in a broad way is "curb." By curb is meant a divisional ridge of various height that serves many purposes such as structural support, division of algal turf treatment areas, as well as dispersed distribution of loads to underlying strata such as soft soil. The word "beam" may be interchangeably used to describe the curbs. Although the curbs may have constant elevation, causing a differential dimension between top of curb and sloped growing surface, a constantly sloping curb is preferred, mimicking the elevation of the floway such that there is no change in dimension from curb to floway from one place to another along the floway. This constant dimensional relationship is preferred to reduce or eliminate the need for elevational changes in the location of the intake plenum means used for removing mature algal turf from its growing surface.

As will be seen hereinafter, for large-scale efforts the algal turf farm may be subdivided longitudinally into various floways, such as by separating walls extending substantially the entire distance between the means for admitting water into the floway at the upstream end, or inflow weir, and the means for discharging treated water at the downstream end, or outflow weir. Both weirs are movable between open and closed positions so that water can be admitted, held for preselected time intervals, and discharged when desired. Additionally the floways are divided into a number of sectors (two in the case described) that serve in description of the harvesting. Such an arrangement makes it possible for the algal turf floway to operate on a continuous basis, with the algal turf continuing to grow in some sectors during the time the algal turf in another sector is being harvested in a dewatered state.

As is known, algal turf possesses the highly advantageous ability of being able to take up, precipitate, adsorb, or otherwise trap undesirable nutrients, contaminants, or minute particulate matter contained in the water, and to incorporate such nutrients into their plant mass and promote a periphytic community of superior particulate trapping ability.

Accordingly, by causing the water to be treated to flow in a prescribed manner over the algal turf, the undesirable nutrients and pollutants can be removed from the water, with the treated water thereafter being permitted to flow back into the lake, marsh, or other waterway or basin in a greatly improved condition.

A basic configuration of the algal turf floway, over which the water to be cleansed is caused to flow continuously (except for short durations at harvest), comprises an upstream weir, a downstream weir, and means defining the curb or sidewalls of the floway, also known as beams, for retaining water within the sides of the floway. Typically a first canal or pipeline brings water from the waterway to the location of the upstream weir such that predictable quantities of water can flow over or through the upstream weir and into the floway. After flowing over the algal turf for a suitable distance, the cleansed water then flows over the lower weir. There can be intermittent notched diversion tabs to trap filamentous algae and particulates as well as enhance mixing and prohibit channelization of water flowing down the floway between the inflow and outflow weirs. These tabs are rigid enough to accomplish the previously described tasks, but flexible enough so as not to require special consideration or repositioning of the vacuum intake during harvest. A second canal or pipeline is utilized to receive the water flowing over the lower weir, which second canal then delivers the cleansed water back into the lake, pond, river, or other such waterway.

In particular sites the inflowing water may have an undesirably low pH. With the addition of calcium phosphate to the inflow water, as shown diagrammatically in FIG. 9, this situation can be remedied, while at the same time adding phosphorus, a primary nutrient for the growing algae, on the culture surface. An exemplary reaction for such a process is:

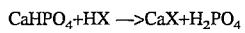

$$CaHPO_4 + HX \rightarrow CaX + H_2PO_4$$

Of course, the specific stoichiometry depends upon the composition of the waste stream. Calcium phosphate salts are useful because they are not soluble in water at circum-neutral and alkaline pH values. It is likely that the phosphate salts $CaHPO_4$, $Ca_{10}(PO_4)_6(OH)_2$, and $FeNH_3PO_4$ would be the most useful, with the iron salt having the added advantage of providing both nitrogen and phosphorus to the algal turf species.

The advantage of using such salts is that these substances remain solid until reacting with an acidic waste stream. Their products reduce acidity while simultaneously providing nutrients required by the algal turf species. Calcium can react with metal ions to chemically precipitate a portion of the metals in the waste stream. The extent of calcium precipitation of metals will depend upon the pH, calcium concentration, and metal concentration.

A suitable bottom surface is provided for the floway that is conducive for the growing of an algal turf thereon. This bottom surface may comprise plastic membranes and films, concrete, asphalt, or naturally occurring geologic features. These surfaces preferably have a suitable texture to provide protection from overharvesting, which can occur on smooth surfaces when the holdfasts are undesirably removed along with the mature algal turf. Conversely, there should not be voids in the surface such that organisms can find suitable domicile and undesirably eat and excrete algal turf as well as reproduce in numbers that limit the productivity of the algal turf communities ability to remove pollutants. There may, however, be small rodlike appendages in all or a part of the floway extending from the growing surface to slightly above the water surface to catch broken-off algal turf and reduce channeling. These remain on the surface during harvest and do not hamper the harvesting process. Examples of these surfaces may include, but are not limited to, rock formations, metals, wood, plastics, fiber-reinforced plastics, glass, ceramics, soils, woven or processed natural fibers, and higher-order plants.

It has been demonstrated that an important relationship exists between the texture of the bottom surface and the colonization and harvesting efficiency of the algal turf system. Specifically, characteristics to be considered include texture amplitude and geometry, the spacing of textural elements in both the longitudinal and transverse directions, and the pattern, roughness, height, and distribution of the elements. Various textural elements can be used in combination, and such patterns tailored to the needs of a particular site, including the slope of the floway, the desired channeling patterns of flowing water, and the design of the harvesting apparatus.

It is known that the cleansing function provided by the algal turf is assisted by having the lower algal turf filaments flashed with light, for this greatly assists the photosynthetic action of plant cells covered by algal turf or of organisms growing on top of them. To this end, a suitable means at a location adjacent the upstream weir is utilized for creating a variable surging action. This means is actuated periodically to cause a wave to pass substantially across all or part of the length of the floway. This surge can in some water systems serve to promote growth of more diverse types of algal turf, such as filamentous algae, on which other epiphytic or attached plants and animals can thrive. The surging can cause the algae to separate and articulate, thereby exposing more of the filaments to sunlight.

Means are also provided for shading a portion of the water surface for providing at least two sectors, one subject to available solar illumination and the other shaded. This permits a variety of algal turf conditions, and thus a variety of cleansing environments.

The surge can take place at different rates and magnitudes. Surges at least once per minute, but preferably approximately four to eight times a minute, can, in certain water systems, serve in a highly effective manner to stimulate the growth of specific species groups, leading to the optimization of the pollutant uptake ability of the algal turf. At some places on the floway the surge may not be readily detectable or even may be dissipated to the point where it is not detectable.

In order to enhance the light intensity impinging on the algae, means may be used to disturb the water surface, changing the angle of incidence of the light on the water. By increasing the refraction-to-reflection ratio, additional light can reach the turf, improving growth.

After a number of days of growth, the algal turf matures, and growth starts to slough off algal turf. Nutrients and pollutants incorporated into the algal turf begin to be rereleased into the water being treated. To harvest the algal turf actively, it is necessary periodically to remove and effectively to dispose of the relatively mature algal turf in order to rid the lake basin or other waterway of these undesirable pollutants. In other words, unless the mature algal turf is harvested in an effective manner, it is possible for the nutrients already taken up by the algal turf to find their way back into the waterway. Accordingly, it is an important purpose of this invention to utilize a highly improved system for removing the algal turf from the growing substrate to which it is attached, without resorting to a scraping effort that might well be counterproductive.

Means are therefore provided for harvesting the algal turf, which is at least five days old, in a dewatered but wet state with almost all associated matter, except algal turf roots or holdfasts. This algal turf is removed in a manner not permitting any significant portions of the mature algal turf to remain in a dislodged and broken down condition such that it is flushed over the lower weir, and thence back into the waterway after harvest.

The preferable means for harvesting the algal turf involves the use of a vacuum system that will remove substantially all of the mature algal turf, thus avoiding the situation often encountered in large-scale operations when utilizing a scraping action, where portions of the mature algal turf often remain and thereafter find their way back into the waterway.

The vacuum intake plenum of the present invention comprises an orifice adjustable in elevation as well as positioning within a specific floway sector, such that the algal turf can be removed from that longitudinal sector. The lateral movement of this vacuum intake plenum can be accomplished by various means. As an alternative, a plurality of fixed vacuum intake plenums can be used for accomplishing the harvesting.

The vacuum intake plenum in a specific embodiment may be equipped with a rotating brush/scraper element for removing algal turf bodies, leaving the roots or holdfasts behind. Compressed air and/or water can be sprayed at high pressure with or without the brush/scraper to dislodge certain micrograzers. The brush/scraper can have notches on the bottom edge, and these notches can be alternated so that only a partial harvest is effected on a part of the floway. Such an alternating pattern of notches can keep undesirable micrograzers under control, preventing an overpopulation of the growing surface, which would result in the micrograzers eating the algae and excreting the contaminants back into the water.

In one form, the brush/scraper element rotates to dislodge the turf from the surface. A variety of designs and materials for this element, as well as a range of rotational speeds, have been tested to optimize harvesting efficiency.

As discussed above, microinvertebrates left behind after harvesting can proliferate and consume significant portions of the mature algal turf and excrete pollutants previously absorbed by the algal turf. The brush/scraper element and bottom surface texture must be optimized to permit maximum removal of these organisms. Specifically, the elements are designed geometrically to cooperatively enhance destruction of unwanted organisms.

A particular example of such an organism is the midge larva "chironomid," a linear organism that builds a Quonset-hut-like shelter from algae and detritus. If the surface bottom texture and brush/scraper are designed with a linear geometry oriented transverse to the floway, the chironomid shelter is protected from removal by the harvester; however, if the elements are nonlinear, effective removal is possible. It has been found that air or water spray nozzles can be effective in removing chironomids from heavy-textured surfaces. The specific pressures are adjusted to avoid damaging the algal holdfasts.

The present invention additionally comprises a method for controlling an undesirable microorganism population level in an algal turf floway. The method, which utilizes a floway as described above, comprises the steps of growing an algal turf on the bottom surface, the algal turf comprising and algal species and the undesirable microorganism population. Such an undesirable population may include such species as Chironomids. When the water is discharged from the downstream end of the floway, and the mature algal turf is harvested, instead of immediately refilling the floway, the culture surface is permitted to dry for a time sufficient to significantly reduce the population level of the undesirable microorganism but insufficient to eradicate the algal species in the algal turf. The length of drying time can be tailored to the specific organisms in the culture, but generally will range from 1 to 24 hours, depending on the rain conditions.

A system without infestation by microinvertebrates can be managed without mechanical harvesting. In this case water flow turbulence causes a sloughing off of the mature algae, which are then strained out of the water after leaving the floway by means such as a continuous rotary strainer. This system, while it cannot offer the performance of the mechanical harvester discussed above, is very low maintenance.

A desirable effect may be attained by constructing floways in series of two or more, water from the outlet of a first floway being directed to the inlet of a second floway, etc. Between the floways is positioned means for cooling the water and/or lowering the pH, preconditioning the water for enhanced scrubbing action in the second floway. These means are to treat the water entering the second (or subsequent) floway to reach optimal growing conditions for the specific culture growing in the floway.

It has been shown that reseeding the floway surface with a desired species or mixed assemblage of plant and/or animal species can enhance the regrowth of the algal turf after harvesting and improve the overall performance of the system. Such a combination may include a filamentous alga and diatoms, which together can grow rapidly and fill the entire water column.

An additional possible element of the purification system comprises means for degrading volatile organic compounds (VOCs) that may be present in contaminated ground water. In a particular embodiment this means comprises an ultraviolet reactor positioned downstream of the outflow weir of a floway. Ultraviolet light is known to promote degradation of chlorinated hydrocarbons such as trichloroethylene, trichloroethane, vinyl chloride, and others. The high oxygen and hydroxyl ion concentrations present in the outflow water aid in the removal of VOCs.

It is therefore an object of this invention to provide an algal turf floway having specific textural characteristics capable of being constructed in many geologic soil conditions that is able to function in a low-cost yet highly effective manner to cleanse the water of a waterway, such as runoff to or from a basin, lake, pond, river or the like.

It is another object of this invention to provide an algal turf floway capable of harvest when mature to effect removal of pollutants during this purification of the water, the floway designed to effect precipitation of contaminants.

It is yet another object of this invention to provide a surging action in all or part of the floway, for causing a more diverse algal turf to develop, and to cause the algal turf to be flashed with light periodically. The water is also mixed, and physically nutrients and particulates are driven into intimate contact with algal cell walls, such that bioassimilation through photosynthesis and trapping action will be greatly enhanced by the algal turf.

It is still another object of this invention to provide for the effective harvesting and removal of mature communities of algal turf in a dewatered but wet state by a vacuum pickup having a nozzle end tailored to optimize harvesting.

A further object of the invention is to provide a method of reseeding specific algal species following a harvest. The species are selected to enhance the proliferation of at least one alga chosen for its efficacy in removing contaminants from a given site.

Another object of the invention is to provide a system that does not require mechanical harvesting, but rather utilizes specific algal species, water turbulence, and filtering to remove sloughed-off mature algae.

An additional object of the invention is to provide ultraviolet irradiation of the outflow water for degrading chlorinated hydrocarbons such as trichloroethylene.

It is yet another object of this invention to provide a power-driven harvester device designed to roll along continuous grade beams or curbs that maintain a consistent flatness of surface or slight slope.

It is another object of this invention to provide a floating barge to collect the algal turf harvest product as well as deliver the harvester from one floway to the next. The barge may have additional processing equipment on board to effect specialized biomass preparation as needs arise.

It is a further object to provide a discharge hose onboard the power-driven harvester for conveying harvest slurry back to a holding barge or storage area, for greatly reducing storage requirements and lightening the wheel loads of the harvester on the support surface.

It is another object of this invention to provide a water-impervious growing surface for prohibiting water saturation of the underlying soft soil, which can cause great reduction in the bearing capacity of the soil.

It is an additional object of this invention to provide intermittent diversion means along the floway to limit flow channelization.

It is yet a further object to raise the pH of incoming low-pH water to enhance algal growth.

It is yet another object to intensify light impinging on the algal surface by disturbing the water surface.

It is an additional object to improve the scrubbing effectiveness by placing two or more floways in series.

These and other objects are satisfied by the present invention, a floway involving a growing surface of suitable texture for optimal algal turf production, located between a spaced pair of curbs, upon which algae can grow and form an algal turf, with a periodic surge of water being caused to flow along at least part of the floway, so as to increase algal metabolism, production, and species diversity, such that nutrients and pollutants contained in the water will be taken up, and particulates contained in the water trapped.

The objects of this invention are also met with the method of the present invention for the purification water by natural means, utilizing algal turf grown on a suitable growing surface disposed between parallel, spaced-apart curbs, which algal turf is harvested, when mature, by the use of a harvester arranged to travel the length of such curbs, upon which harvester a vacuum intake plenum is utilized, with the disposal of the harvested algal turf being accomplished in such a manner as to prevent any entry of the algal turf into a waterway.

These and other objects, features, and advantages will be more apparent from the drawing.

BRIEF DESCRIPTION OF DRAWINGS

FIGS. 3c and 3d are related views, with FIG. 3c showing algal turf pickup by the use of a bidirectional pickup nozzle, with travel taking place from left to right, whereas FIG. 3d shows the same pickup nozzle, with travel taking place from right to left;

FIG. 4b is a front elevational view of the same harvester depicted in FIG. 4a.

FIG. 6b is a plan view of a specific brush/scraper.

FIG. 8 is a diagram of a floway seeding apparatus in (a) plan view and (b) longitudinal section.

FIG. 12 illustrates photographically the light focusing effect of waves on a water surface, with (a) a pair of and (b) a single disturbance.

DETAILED DESCRIPTION OF THE PREFERRED EMBODIMENT

Figure 1:
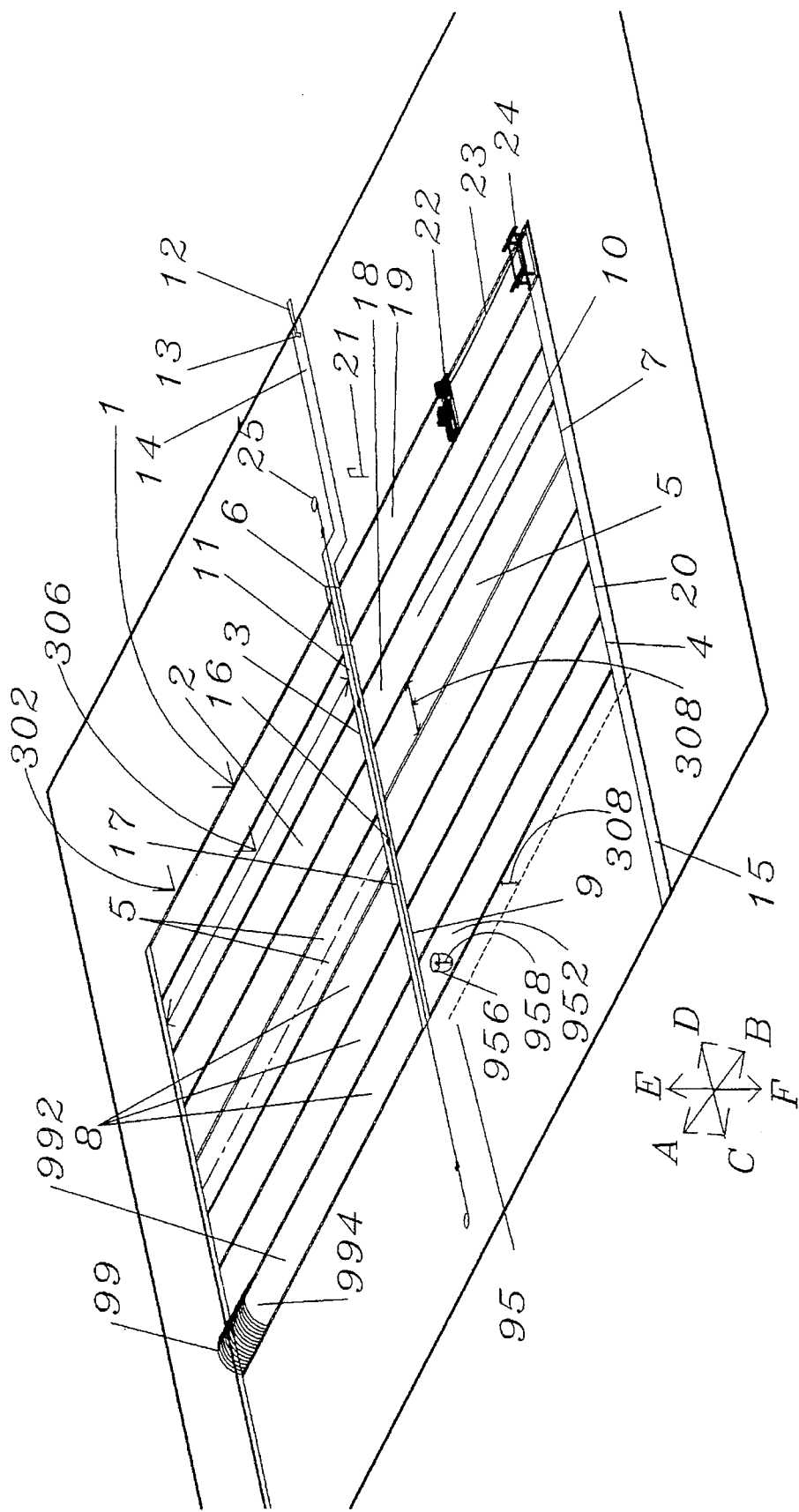
FIG. 1 is a perspective view of an algal turf farm, in which numerous floways are defined, with water from a lake, marsh, pond, river, or other waterway being caused to flow along such floways, with this figure also indicating the use of adjustable inflow and outflow weirs, for controlling the flow of water.

With reference to FIG. 1, an algal turf farm 1 is located adjacent a form of waterway created for the continuous purification of water. A number of algal turf floways 2 are provided in which communities of algal turf grow under suitable conditions. Each floway 2 has an upstream end 302, a downstream end 304, a length 306, and a width 308.

In one embodiment, each algal turf floway 2 is 22 feet wide and 750 feet long, these dimensions being linked to treatment parameters for one particular water system. The invention is not intended to be limited to any particular size or configuration of an algal turf floway. In general it has been found that the floway should be at least as long as it is wide.

The length 306 of the floway 2 has also been shown to affect the performance efficiency of the system. As discussed, a longer floway that is frequently harvested has a limited supply of carbon to be bioassimilated from decaying material. When the algae then turn to other forms of carbon, such as bicarbonate, the pH of the system rises, and phosphorus and other compounds precipitate out from the water, permitting further cleansing action. The pH of the system may then be returned to normal levels with the use of aeration or an addition of ambient water to be purified.

An exemplary floway length 306 would range between 100 and 10,000 feet, and a width from 1 to 50 feet, although these numbers are not meant to be limiting.

As will be seen hereinafter, the invention may also be practiced on the scale of an algal turf farm 1 divided longitudinally into floways 2 by the use of separating walls or curbs extending substantially the entire distance from inflow weir 3 to outflow weir 4. Further, each floway may be regarded as being divided into sectors 5, as is to be seen on the left side of FIG. 1.

In accordance with this invention, a harvester 22 moves along each of the floways 2, one floway at a time, with a vacuum pickup arrangement having a brush/scraper at the end for harvesting the mature algal turf in only one half or sector 5 of the floway during movement of the harvester 22 in one direction, and then for harvesting the algal turf in the other half or sector 5 during movement of the harvester 22 in the return direction. The details of the harvester 22 will be discussed in detail in connection with FIGS. 4a and 4b.

One advantage of a divided farm is that harvesting of mature algal turf can take place in one floway that has been dewatered. Such is accomplished by virtue of the placement of an inflow weir dam 6 and removal of outflow weir sluice gates 7, which greatly diminishes flow and allows gravity to dewater but not dry the algal turf while full flow is continuing in other sectors. This practice greatly enhances the harvester performance with minimal water collection and greatly reduces algal turf processing effort.

As shown in FIG. 1, the algal turf floway 2, over which the water to be cleansed is caused to flow continuously, may comprise an upstream or inflow weir 3, a downstream or outflow weir 4, and curb means defining sidewalls 8 of the floway. The sidewalls 8 may also be referred to as beams or curbs. A variety of sidewall 8 constructions is illustrated in FIG. 2a–e, having surfaces 100,200,300,400 and curb types 102,202,302,402.

The sidewalls 8 are of consistent height so as to form the support for a harvesting vehicle mounted on wheels. The sidewalls are of sturdy construction and in some cases have relatively wide bases, so that they can distribute harvester loads over soft soils and not become displaced during use, even though supported over relatively low-bearing-capacity soils. A consistent spacing is used between each adjacent pair of sidewalls, so that the harvester 22 can travel therealong during the harvesting of mature algal turf.

The upstream or inflow weir 3 can be of adjustable height, so that the flow of water over the weir can be carefully controlled. In addition, the inflow weir 3 may utilize articulation, such as, but not limited to, notches 9 placed at the top of the inflow weir so as to have a favorable effect upon the surging or spillage characteristics of this weir. As previously mentioned, the flow of water across the inflow weir 3 is preferably reduced just prior to and during harvest by placement of an inflow weir dam 6, and removal of outflow weir sluice gates 7, at the time the mature algal turf is to be harvested, so as to greatly reduce the water component and weight of the harvest wheel loads.

Figure 5A:
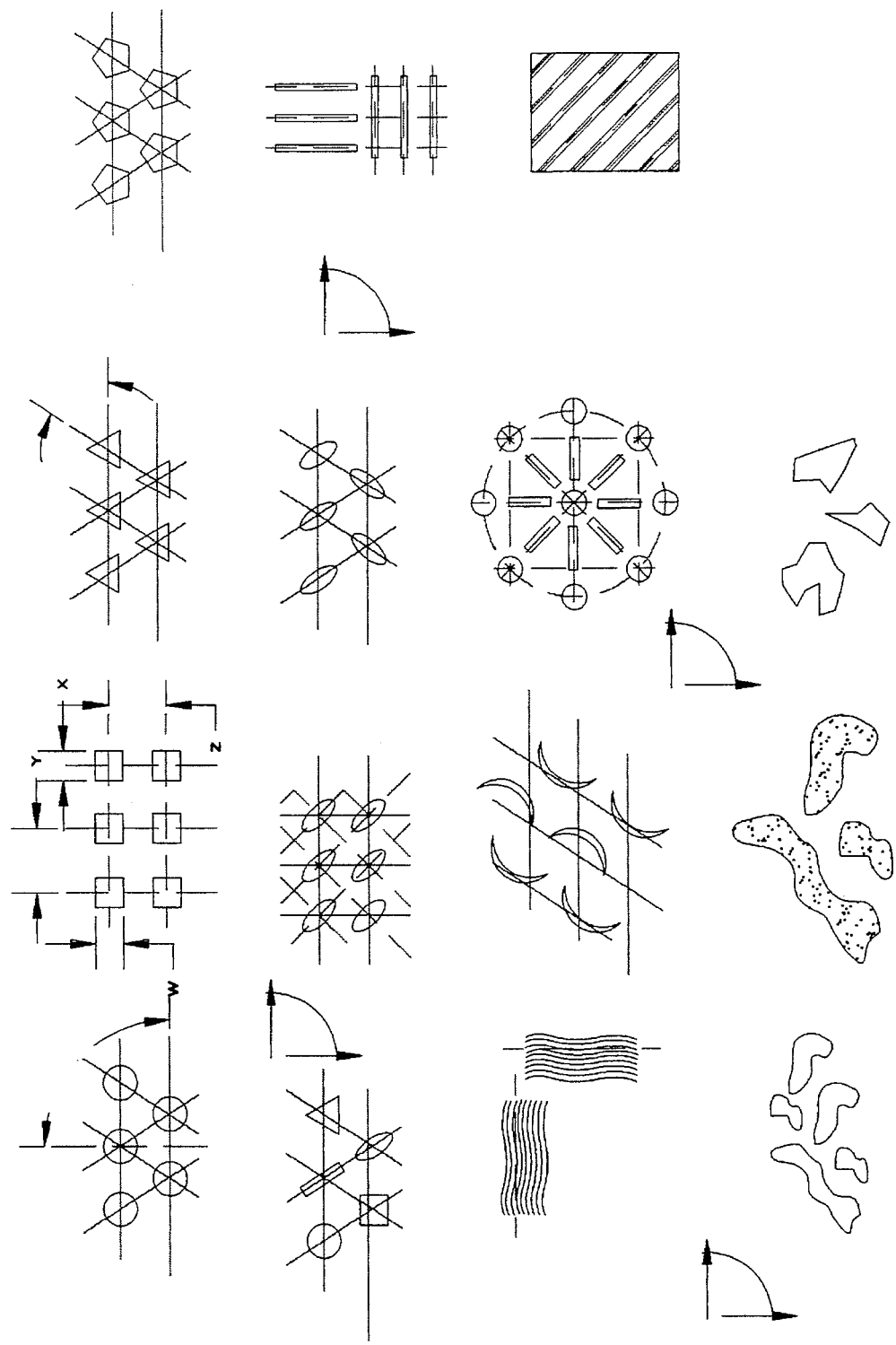
FIG. 5a is a plan view of several textural elements.
Figure 5B:
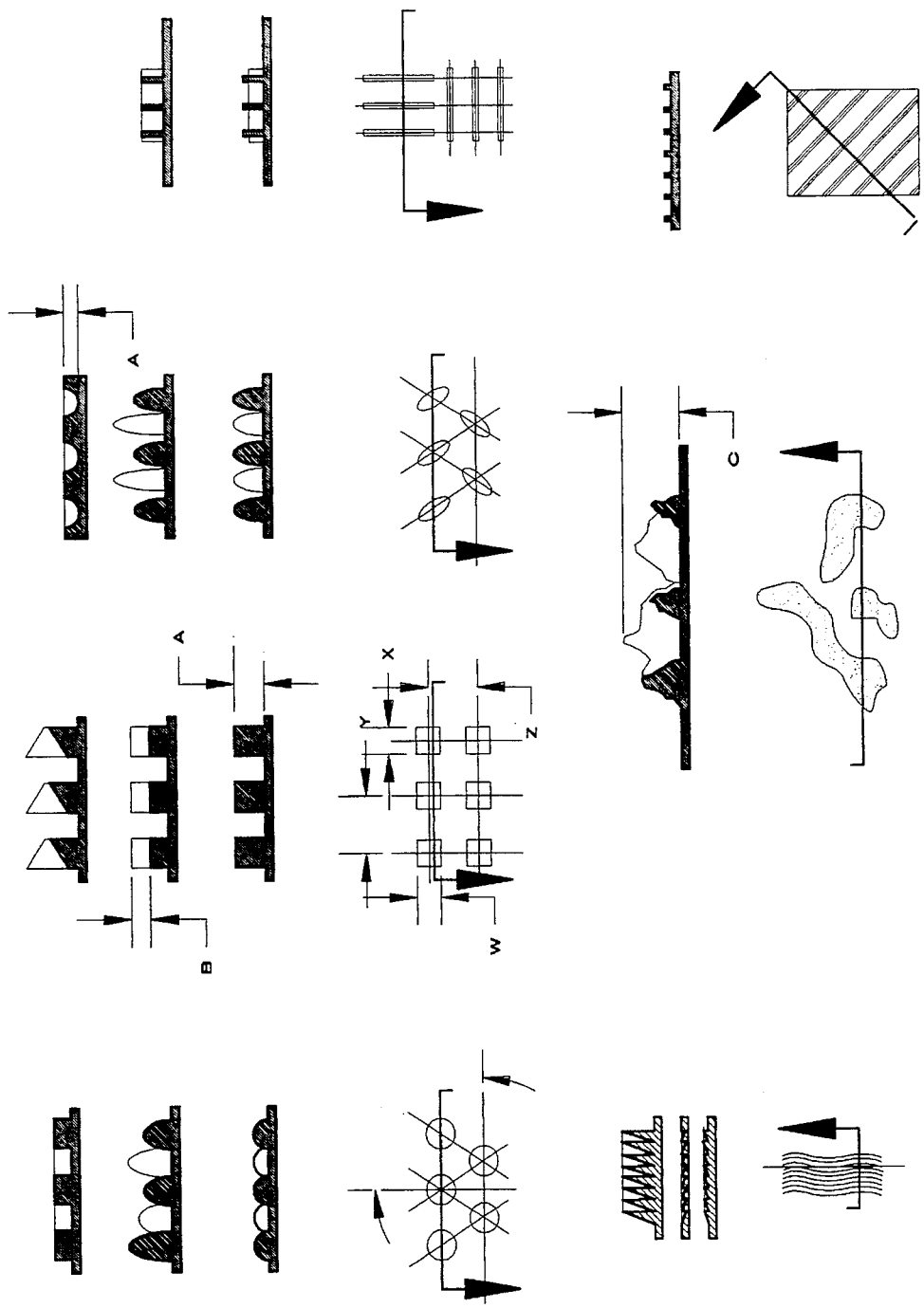
FIG. 5b is an elevation view of a specific textural element.

A suitable bottom surface or growing surface 10 for the floway is conducive for the growing of an algal turf thereon (FIGS. 5a and 5b). This surface can be of a wide range of materials as long as the texture is such as will enable algal holdfasts (roots) to remain after harvest, while possessing the characteristics of compatibility with the harvest procedure, being able to withstand ultraviolet light, and being usable as a growing surface for an acceptable length of time. There can be rodlike pins spaced intermittently or in patterns extending from the growing surface to just beyond the water surface for catching dislodged algal turf. However, the surface should not be of such a nature as to permit algae-eating organisms to remain after harvest, for should such organisms reproduce in large numbers, their excretion of digested biomass would limit filtration efficiency.

Figure 2A:
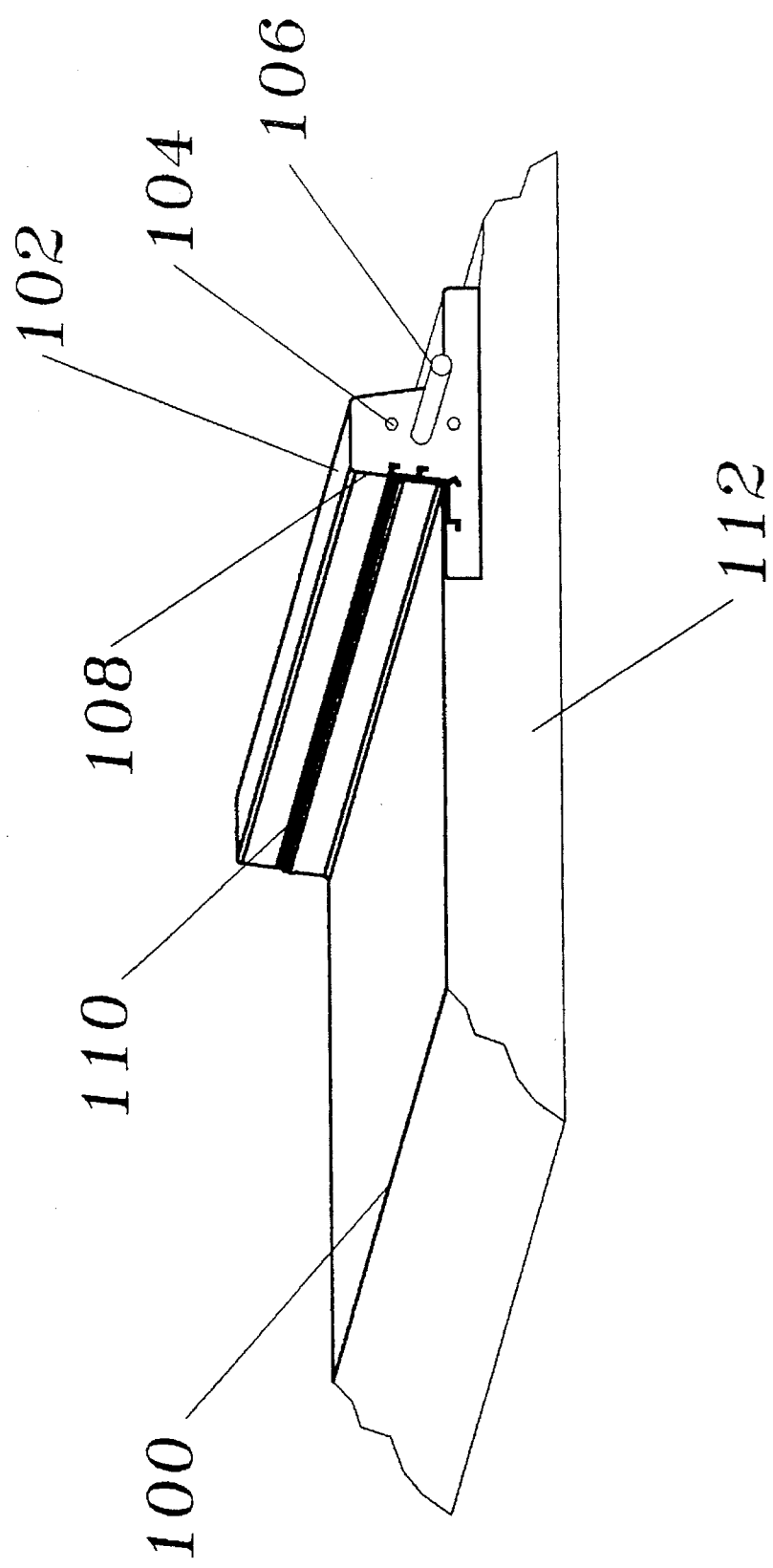
FIG. 2a is a perspective cutaway view depicting one type of curb or beam utilized to define a floway in accordance with this invention, with this view also showing the manner that a thick, high strength polyethylene growing surface may be attached to the curb.
Figure 2B:
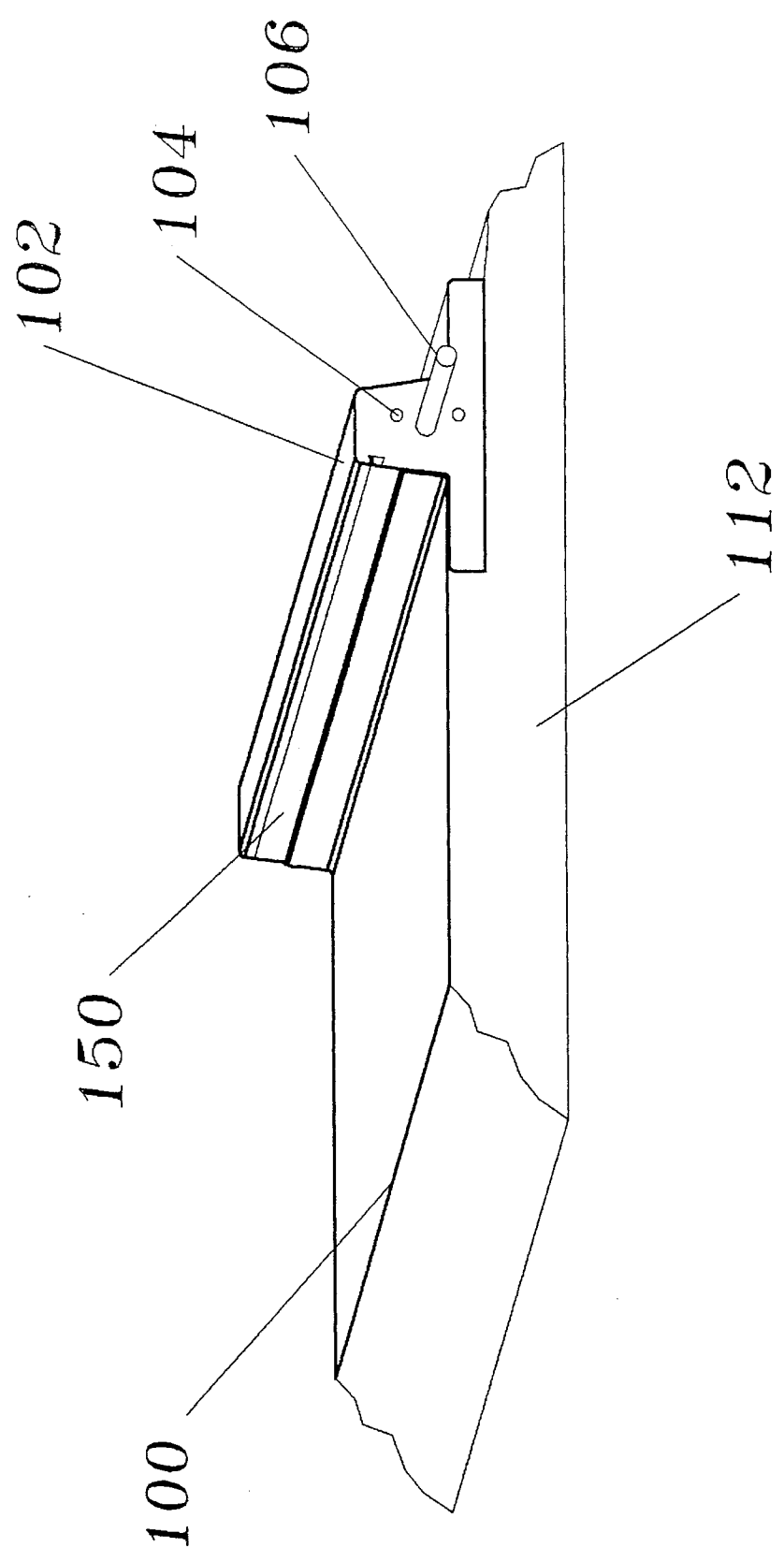
FIG. 2b is a perspective view similar to FIG. 2a, with this view showing another way for attachment of the growing surface to the curb or beam.

As may be seen in FIG. 2a and 2b, it is typically preferable to use materials such as high-strength polyethylene (HSPE) plastic or other plastic liners 100 in soft soil areas, as well as natural limestone formations, concrete, asphalt, asphalt/rubber, and polymer combinations. Note also FIGS. 2c, 2d, and 3. Again, these materials are exemplary and not meant to be limiting.

FIGS. 5(a) and (b) illustrate a series of textural elements designed for use on bottom surface 10 of a floway. Each of these exemplary textures is used to optimize the purpose and population of an individual floway system, as well as the growing conditions.

Typically a first or inflow canal 11 is utilized for bringing water from the waterway to be cleansed to a location adjacent the upstream or inflow weir 3. The inflow canal 11 can be unlined, or alternatively it may be lined with a plastic, wood, steel, or concrete liner, or a grout-filled mat or sheet pile system. In an alternate embodiment, a pipe or other means of conveyance may be used to bring water to the weir 3. The effect of moisture on soil characteristics and the availability of materials and skilled labor are usually the factors considered in the selection of these options.

The substrate under growing surface 10 may be selectively dewatered by suitable dewatering pumps 21, which automatically pump water collected at subsurface intakes to surface locations to maintain moisture of subsurface soil.

With regard to the water from the waterway to be purified, in some instances, water flows by gravity to the inflow canal 11 at a location adjacent the upstream or inflow weir 3, but in other instances, it is necessary to utilize a pump 12 and suitable piping 13 in order that predictable quantities of water can be provided at outlet 14 to the location adjacent the upstream or inflow weir 3. The pump 12 is preferably a centrifugal or axial flow pump, but the design of the pump is not of particular consequence to this invention.

In particular locations, such as a Department of Energy site in Butte, Montana, inflow water can have extremely low pH values (here pH~2). At such low pH levels algae cannot grow. The addition of calcium phosphate to the water either prior to or immediately after entering inflow weir 3 serves the dual purpose of raising the pH and adding nutrient phosphorus for the algae's consumption.

After flowing over the algal turf floways 2 for a suitable distance, the cleansed water then flows over the outflow or downstream weir 4. A cond or outflow canal 15 receives the water flowing over the outflow weir 4, which second canal then delivers the cleansed water back into the lake, pond, river, or other such waterway.

Because of the nature of the algal turf community, it is highly desirable to cause the water to be purified to pass in surges over all or part of the algal turf. One method to create such surges by the use of a periodically operating lightweight, buoyant piston as described in the present inventor's U.S. Patent No. 5,131,820. Here in FIG. 1, a wave-making device 16 in canal 11 is placed at the upstream end of the floway or growing surface, immediately upstream of the upstream weir 3, as well as in other inflow canals 11 such as in the canal at the top of FIG. 1.

As shown in FIG. 1, the wave-making device 16 may comprise a cable or cord 17, which moves several floating volumes 16 that displace water and create a wake 18 when actuated in the general direction C–D of the cable or cord, similar to that from a boat. The cord is actuated by a power-driven wheel 25 that has a means of alternately rotating clockwise and counterclockwise while wrapping the cable 17, causing float 16 to disturb the water, creating wave surge 18. By this arrangement, a suitable disturbance 18 is created in the inflow canal water surface, which translates into a desirable surging articulation of water entering each floway 2.

Although a particular speed of operation is not to be taken as a limitation, it is desired that a surge of water pass over the algal turf of the floways at least once per minute, but more preferably the surge of water passes over the algal turf at least once every 15 seconds. These waves of water result in a desirable form of surge action, with the water passing over the inflow weir 3, causing nutrients to flow over and be driven into intimate contact with the algal turf. This enhances nutrient uptake by the algal turf through bioassimilation, and trapping by the algal turf.

The preferred surging device is designed to articulate the water and affect the growth of certain and varying algal turf species that may dominate a portion of the growing area. Consequently different filtration objectives may support different surge rate and strength variations, and these variations can be manipulated to tune the algal turf floways to suit the water filtration objectives.

For example, algae in high surge zones can tolerate greater flow variations such as a 1–10x increase over minimum algal turf community sustenance levels. This type of environment stimulates the proliferation of filamentous algae that are generally better suited to removal of reactive nutrients and pollutants.

Water in low surge zones is capable of supporting more fragile plant assemblages as well as diatom proliferation and attachment. These areas are not as stable in variable flow environments, but they display optimal particulate trapping ability. The present invention is of sufficient breadth that various techniques may be utilized as are appropriate in a selected instance for a given water system filtration requirement.

The preferred height differential between the inflow 3 and outflow 4 weirs is dependent upon the length 306 of the floway and the speed of water flow that is desired. The normal weir differential is in the range of 1 to 20 inches, but this is not intended to be a limitation. In some locations, such as in a fallow field during harvesting, algal turf can be grown in a flooded location where virtually no slope is present and to a large degree the weir elevation differential is dependent on water flow rate.

There is a desirable range of water depths 308 in the floway that is required to maximize the device performance. As an example, algae are rooted on substrate support algal plant canopies and epiphytic (clinging) plants and other organisms attached to plants that will grow to fill between 0.5 and 6 in. and up to 12 in. depth of watering.

So while the desired depth of water in the floway is from 1 to 3 in., tolerances for the process have been shown to work satisfactorily up to 6 in., and depths to 12 in. are acceptable in some places. The desired range of depth of water is from a minimum of approximately ⅛ in. up to something on the order of 6 to 12 in., as previously described, with the particular range of depths being brought about by a suitable manipulation of the weirs.

As will be understood by those skilled in the art, water treatment occurs while the water is moving across the algal turf, at which time the pollutants come in contact with the algal turf or are otherwise trapped by organisms in the periphytic mat. Algal turf is a diverse and stable community with respect to production in all seasons and comprises many organisms, which can include that which is ambient in the water system or a modified plant and animal community achieved through inoculation of nonambient constituents.

It is well known that an optimum uptake of nutrients is accomplished by algal turf that is from 4 to 25 days old, with it being preferable that algal turf that is approximately 7 to 15 days old be regarded as mature and therefore removed from the floway. The length of harvest is determined by monitoring the quantity of cells falling or sloughing of algal turf off the floway surface, and harvesting prior to high slough conditions with consideration of expected flow rates. As is obvious, care must be taken in harvesting the algal turf, for it is desirable for the remaining algae holdfasts to regenerate algal turf quickly.

As mentioned, the water being purified continues flowing down the growing surface 2, in the direction A–B, guided by the sidewalls or curbs 8, and thereafter flows over the outflow or outflow weir 4, and thence into the second or outflow canal 15. From this canal, the treated water flows back into the lake or other waterway. It should be noted that a filter or a screen strainer can be utilized along with the intermittent flow diversion tabs 19 in conjunction with the outflow weir 4, so that algal turf slough may be captured and restrained from the outflow water. For example, closely spaced vertical pins 20 or a coarse mesh at the top of the outflow weir can hold dislodged algal turf filaments, which then can be gathered at harvest time.

As mentioned when considering prior harvesting methods, mechanically scraping the screen or other substrate upon which the algal turf is growing often causes portions of the algal turf to be left behind, and thereafter carried back into the lake or other waterway. Accordingly, it is most important that the harvesting procedure serve effectively to remove pollutants absorbed from water and otherwise trapped by algal turf, leaving behind only the algal roots or holdfasts. If these pollutants and nutrients are to be prevented from re-entering the filtered water, it is advantageous to utilize a vacuum system such that large quantities of algal turf are entirely removed from the growing substrate, leaving only the roots or holdfasts attached to the substrate (FIG. 3a–d).

Depicted in FIG. 1 is a harvesting barge 24 that not only serves to collect and store the considerably heavy harvested algal turf slurry and transport it via the outflow canal to a collective storage location, but also is equipped with means of lifting and moving the harvester from one floway to another floway so that harvesting can be executed on multiple floways with one harvester vehicle. The details of the barge 24 will be discussed at greater length hereinafter.

It has been mentioned that an algal turf harvester 22 moves along beams or floway tracks in the harvesting of the algal turf. These beams or rails, one of which is depicted in FIG. 2a, are also known as the floway track grade beams 102. The beams are placed at a consistent spacing and serve to distribute harvest load to soft soil 112 over a wide area and reduce settlement and rutting by heavy wheel loads encountered with harvesting equipment. The beams also provide an anchor or attachment for the sides of the membrane 100 for algal turf growing area, as will be noted in FIG. 2a. These beams range in base width size from 12 to 72 in. for spacings of 10 to 40 feet, and can be wider in larger applications. These beams are assembled such that they can be structurally contiguous via prestressed tension reinforcement strands 104 and structural splices 106 to the extent that harvester wheel loads do not cause high bearing pressure at beam splice points.

Also shown in FIG. 2a is a fusion weld 110 of this plastic membrane material, with such a weld being commonly performed with equipment such as MUNCH tool Type U ii or Type E sold in the United States through Polyflex Corp.

FIG. 2b shows a second method of attaching the edge of a membrane to the beam whereby a ringlet and flashing 150 as typically used on building roof parapet details is installed and has the advantage of venting such that gases that can build up under the membrane may be allowed to escape to the atmosphere. The grade beams or curbs are composed of precast, pretensioned high-strength concrete such as typically used in building construction and designed under standards of the Precast Concrete Institute and other organizations (see FIG. 2a). It may be advantageous in some conditions to utilize a means of maintaining the distance between or gauge of the concrete beams such as a tie strand or beam running perpendicular to the grade beams below the membrane. This concrete element is structurally sized by those skilled in the art after consideration of detailed site conditions, specifically soil-bearing capabilities and loading parameters. These parameters can vary with the moisture range of the submembrane soil, so for this reason the design of canals 11 and 15 should be strongly considered on analysis of this system. To control the soft soil moisture content further, dewatering pumps, or well points 21, are employed, as mentioned in conjunction with FIG. 1. These pumps are placed at intervals according to previously described issues, and serve to maintain a specific moisture content of soil, by pumping water from the submembrane area to the membrane surface, such that the conditions that support grade beams with stability may be safely maintained. Neither a specific size or configuration nor this method of soil moisture maintenance is intended to be limiting, as conditions are rarely the same in any two locations.

The harvester 22 may be utilized either with a floway of the type depicted in FIGS. 1, 2a, and 2b, or in a more elaborate floway arrangement of the type depicted in FIGS. 2c, 2d, and 2e, which will be discussed hereinafter.

The algal turf growing surface 62 may, for example, be a 60 mil high-strength polyethylene liner with heavy texture similar to that manufactured by Polyflex Corporation or Gundle Corporation and typically deployed for 20 years in containment of landfills or hazardous waste facilities.

Figure 2C:
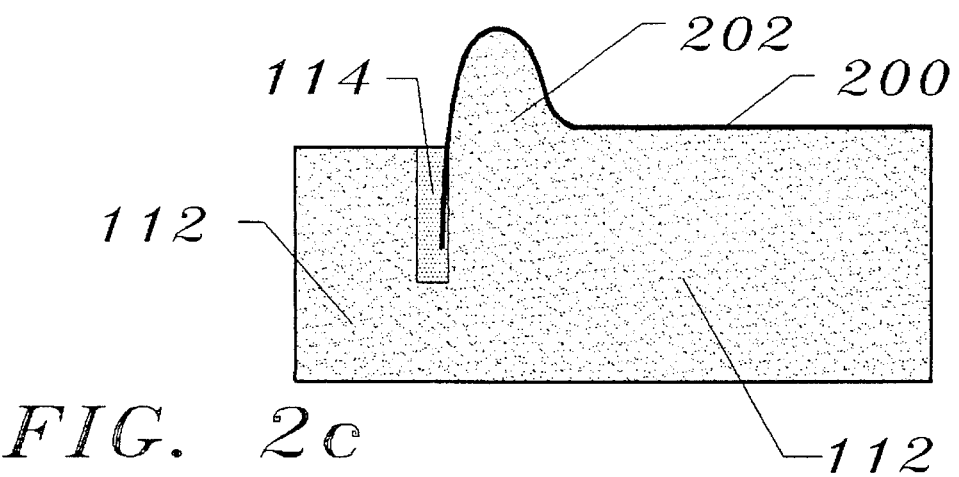
FIGS. 2c, 2d, and 2e are cross-sectional views of other types of curb and growing surface arrangements that may be utilized in accordance with this invention.
Figure 2D:
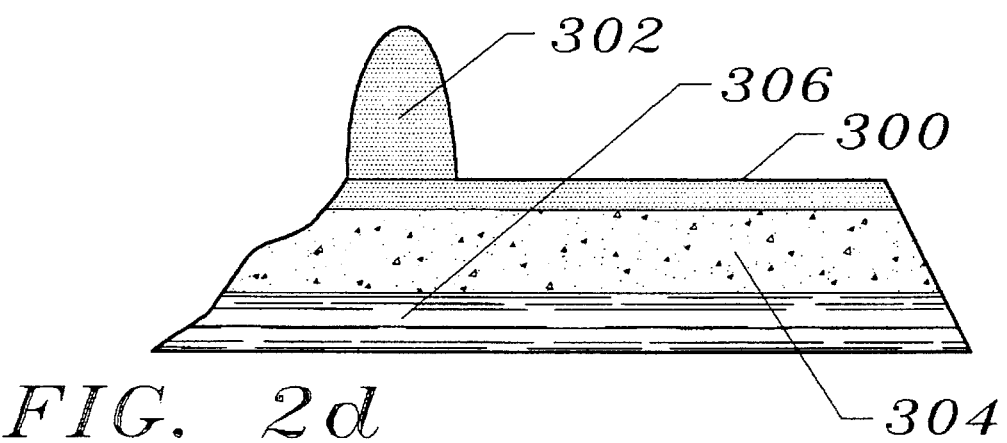
Figure 2E:
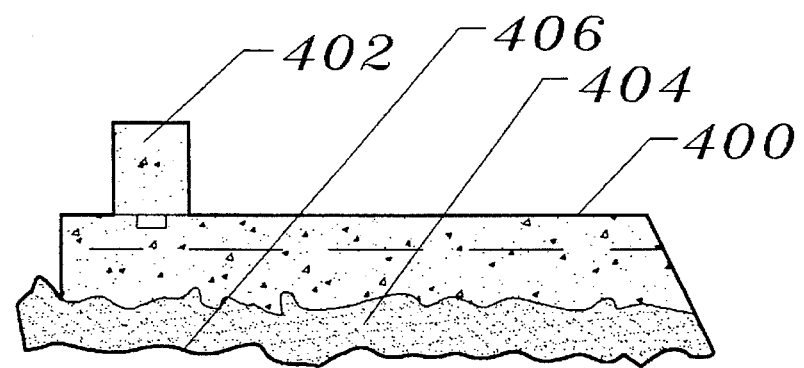

With reference to FIGS. 2c–e, it will be noted that these figures delineate other means and materials that can be used in the construction of floways. FIG. 2c shows a membrane scheme whereby HDPE (high-density polyethylene) 200 is spread over finely graded soft soil 12, and a ditch is made to accept the end of membrane 200. The soil excavated fills trench 14, and a membrane-covered curb 202 is formed by fabric 200 and soil piled at edges of the floway. This type of floway requires a harvester that will span the soil formed curb and move on large rubber tires that bear directly on the soil some short distance outboard of the soil formed curb. Such rubber tires are common on agriculture equipment. In alternate embodiments, a hot asphalt rubber spray may be used on the membrane with reinforcing fibers, and also an aggregate texture surface may be used for the liner fabric.

The schemes represented by FIGS. 2d and 2e are suitable only for higher-range subsoils conditions, natural or manmade. FIG. 2d is a simple asphalt growing surface 300 typically used for road pavement with an asphalt curb 302. This assembly is installed over a higher-strength stable compacted fill 304 in accordance with standard practices of the pavement industry. FIG. 2e shows a reinforced concrete growing surface 400 and a reinforced concrete curb 402 that act in the same basic capacity as the previously described asphalt scheme detailed in FIG. 2d. Both schemes delineated in FIGS. 2d and 2e would accept either type of harvester wheels.

Figure 3A:
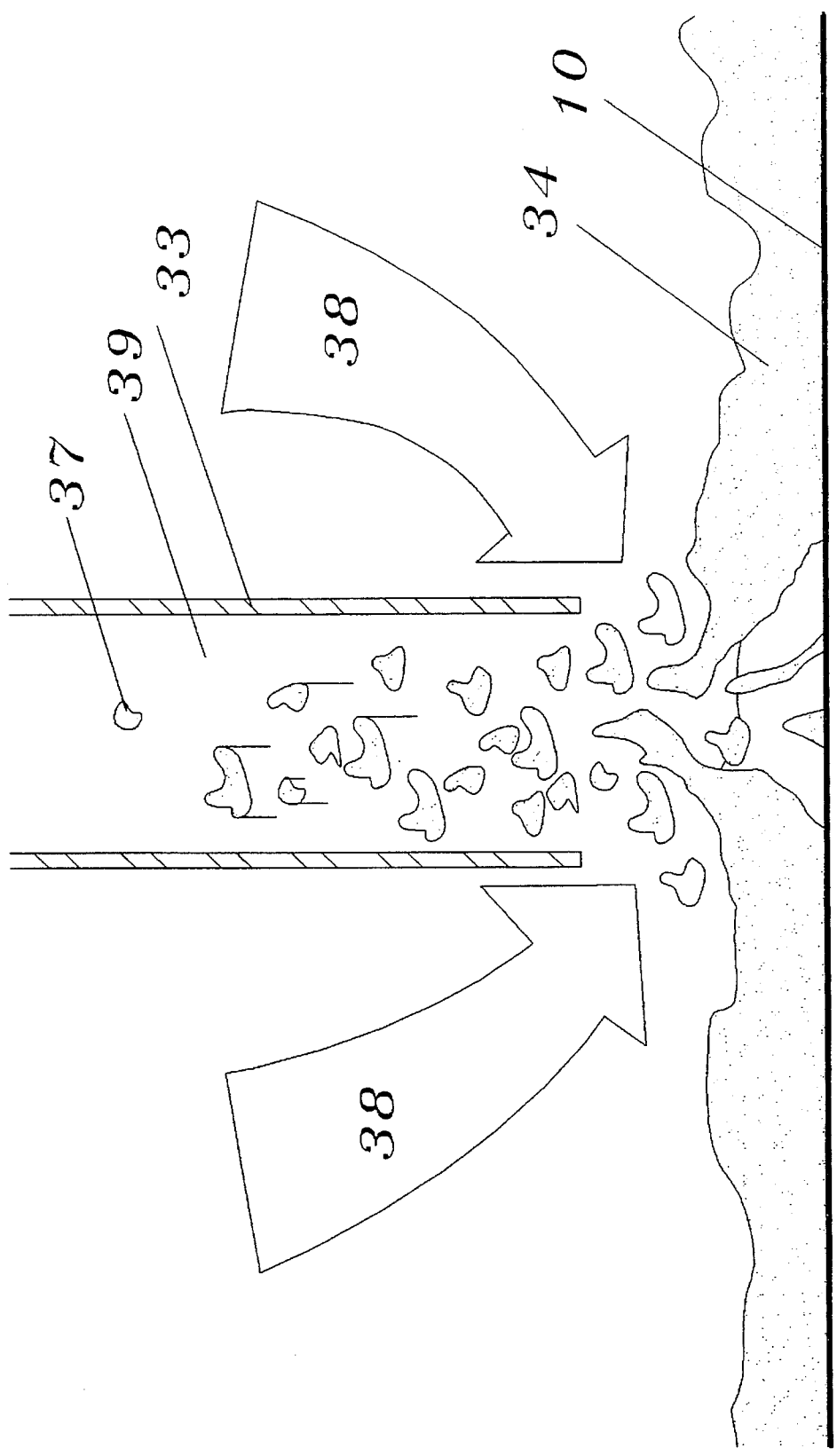
FIG. 3a is a cross-sectional view showing one type of vacuum pickup that can be utilized for removing mature algal turf from a floway.
Figure 3B:
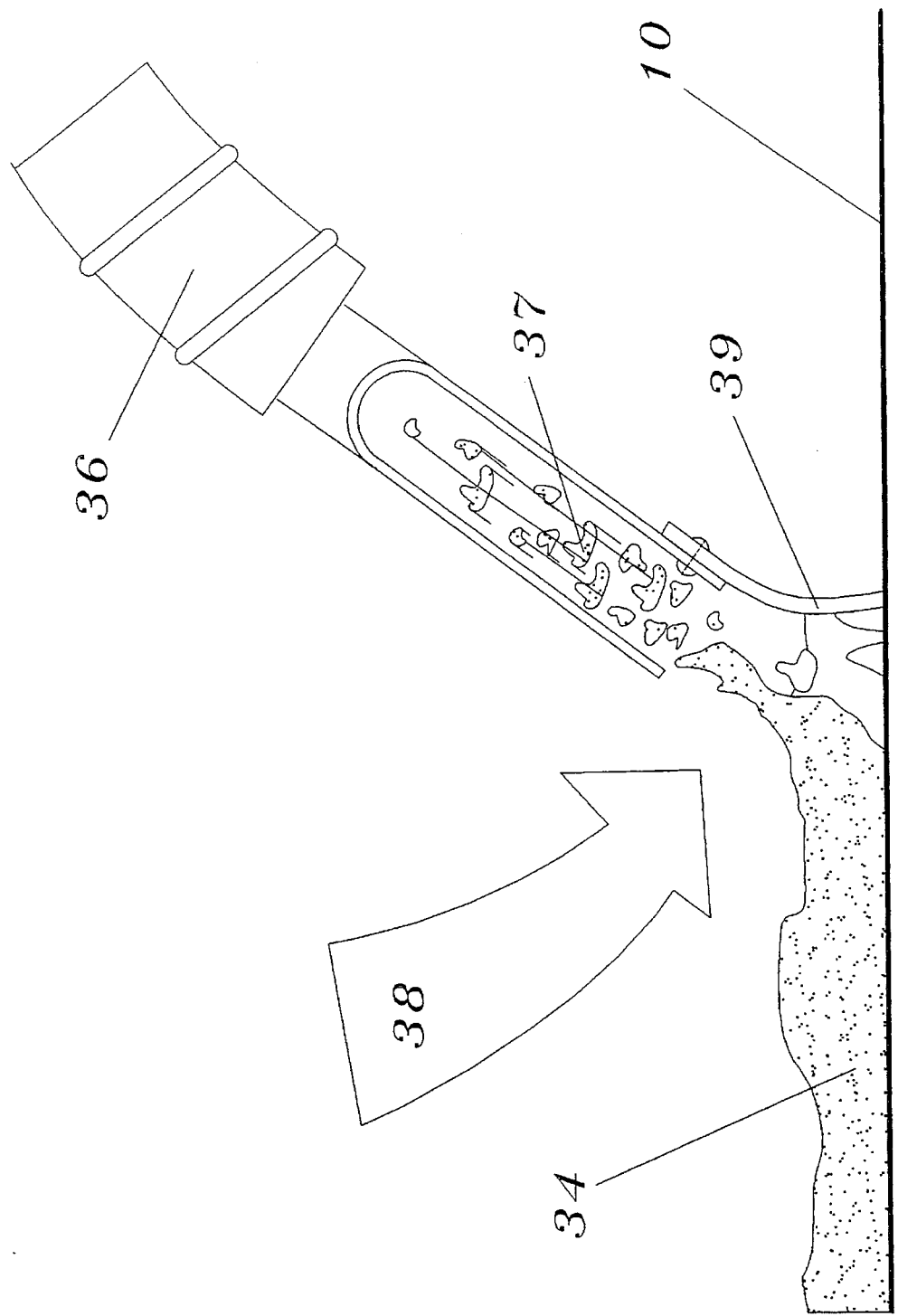
FIG. 3b is a cross-sectional view of a different type of vacuum pickup, this one utilizing a squeegee or brush for aiding the removal of algal turf from the growing surface.
Figure 3C:
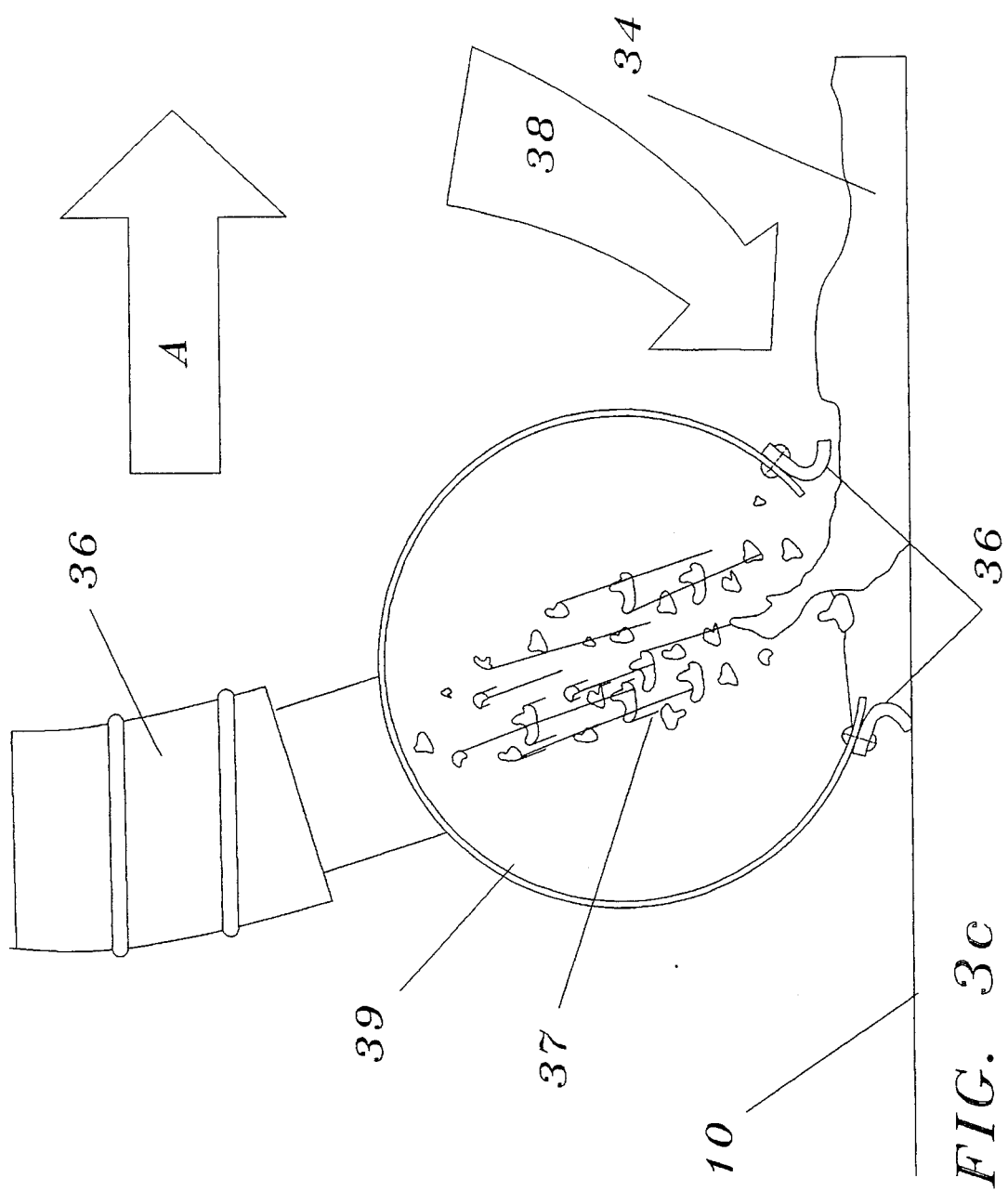

What is referred to as the vacuum intake plenum (or intake nozzle or pickup) is desirably between 1 and 6 in. wide and 2 and 50 feet in length with multiple pickups utilized on wider floways, and is preferably configured such that vacuum principles are employed to lift the wet algal turf off the growing surface (FIG. 3a–c). This is accomplished (FIG. 3a) by passing the orifice of the intake plenum 33 across the wet algal turf 34 such that the harvest slurry 37 passes into close proximity with the orifice, and the algal turf is caused to be dislodged and moved by ambient air 38, passing to a low-pressure area 39. The air flow in cubic feet per minute is between 25 and 25,000, and the vacuum pressure is between 2.5 and 250 in. of water, as measured in accordance with standards in the industry. The algal turf must come very close to (2 in. or less) or actually touch the orifice of the vacuum intake plenum to be adequately removed and conveyed.

As shown in FIG. 3b, the orifice of the vacuum intake plenum may utilize a flexible scraper or brush to accommodate irregularities in the growing surface. A desirable harvesting action is achieved by the addition of a rotating scraper/brush 502 (see FIGS. 6a,b), which contacts the growing surface and serves to dislodge the algal turf. A notched scraper/brush 504 (FIG. 6c) can be incorporated to provide a thinning-type harvest, the notch size and distribution being tailored to remove a desired amount of mature algal turf. Different notching patterns can be used in different harvests so that microinvertebrate populations can be controlled, while at the same time the average algal filament age can be extended beyond the basic harvesting interval of the floway. This thinning effect permits the filtration of the algal turf floway to remain more stable immediately after harvest.

Figure 6A:
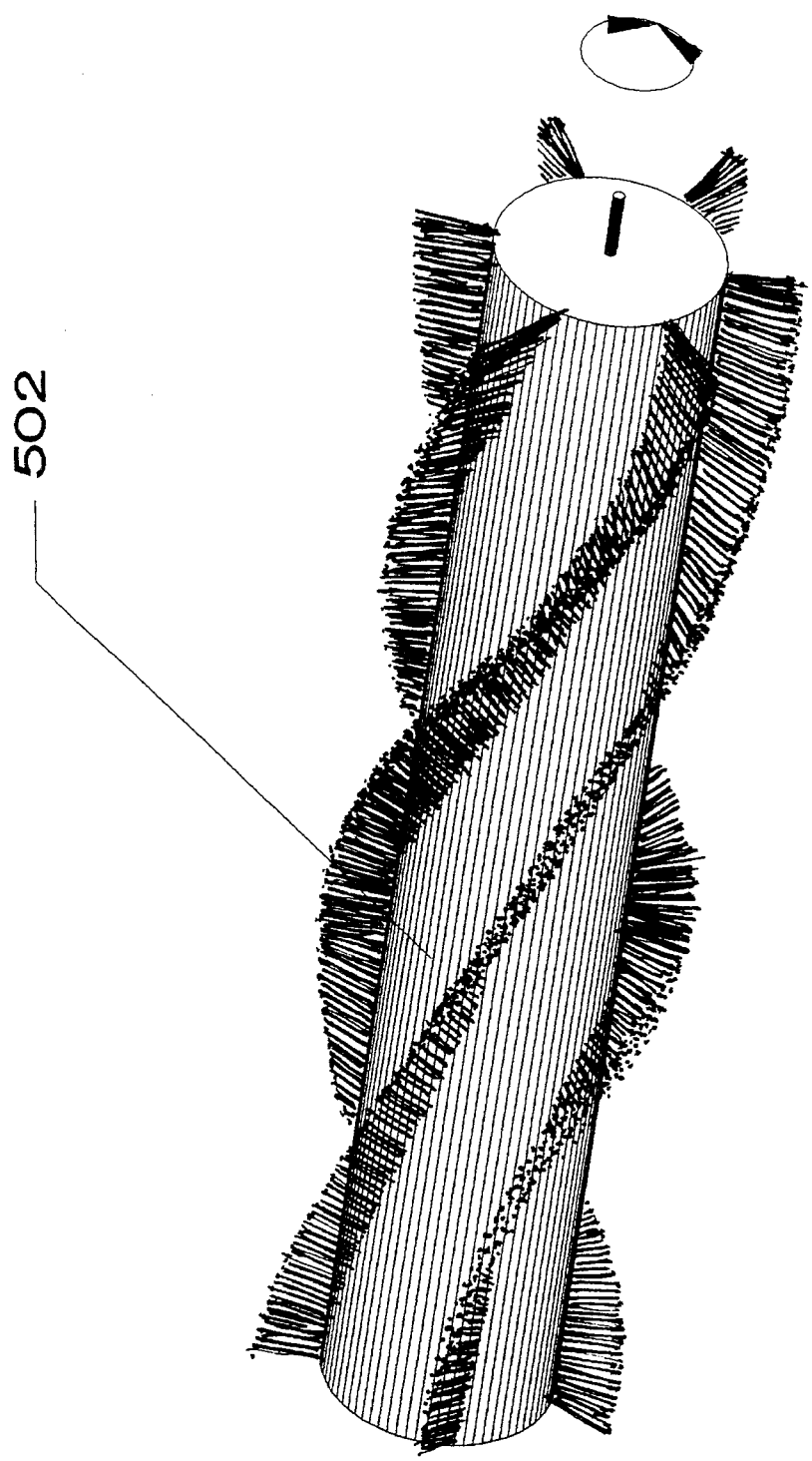
FIG. 6a illustrates a specific brush/scraper.
Figure 6C:
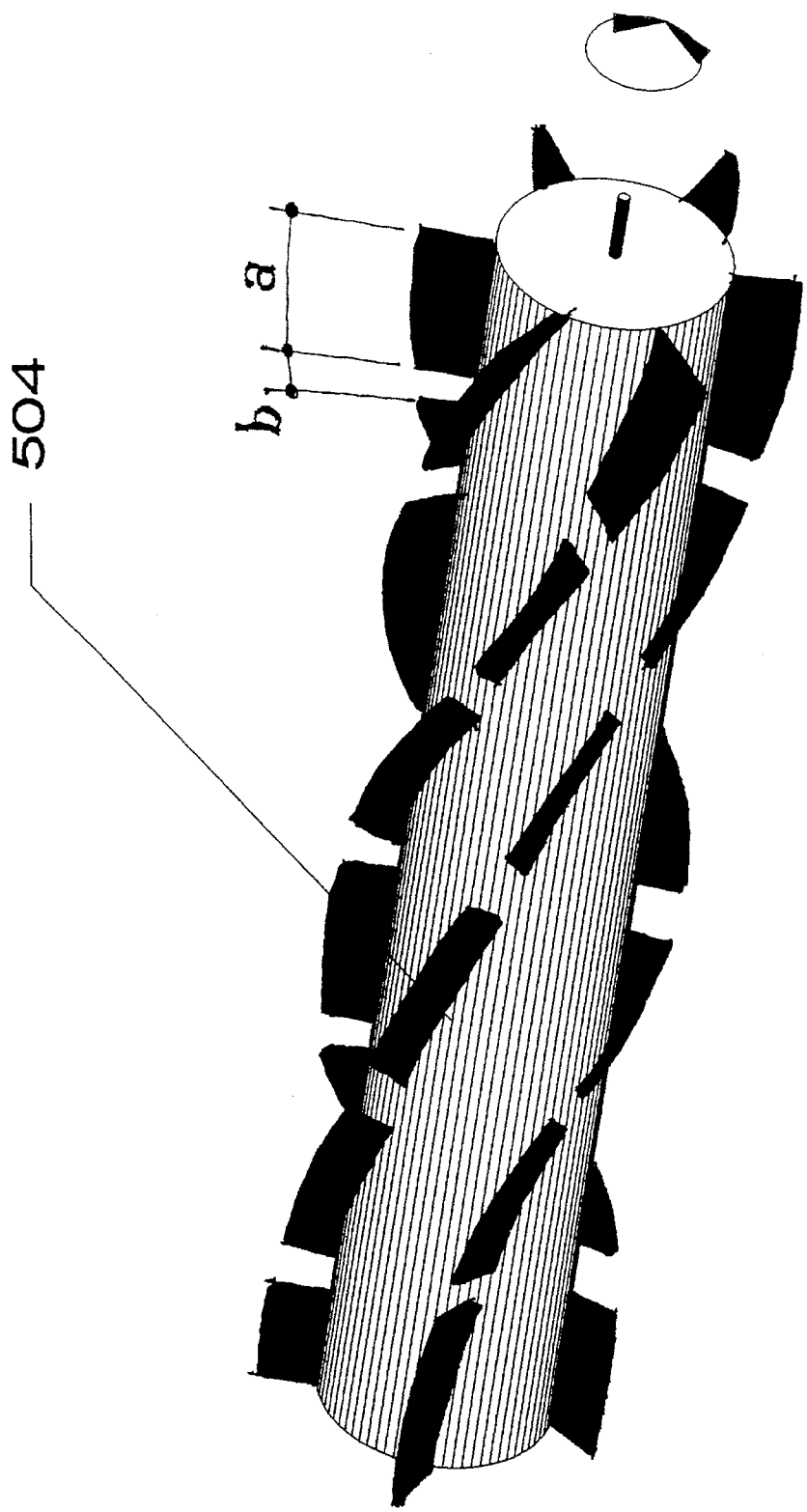
FIG. 6c illustrates a notched brush/scraper.

The notch depth 506 determines the amount of thinning and algal turf removed, the remaining, unharvested turf referred to as the "residual crop tissue mass." Exemplary notch widths are from 0.25 to 12 in., with a spacing 508 of 0.25-12 in. A notch width of 1 in. with a 1 in. spacing is particularly suitable for the filamentous communities, the 1 in. channels having been found to provide an optimal width for efficient distribution of water flow, mitigating the effects of major channelization of the periphyton growth. This notching also has the advantage of providing ample space between strips of residual crop tissue mass, which quickly reproduces back into the void, and thus enhances postharvest regrowth. In additional embodiments, multiple scrapers can be used with various notching arrangements, and they can be articulated in a direction perpendicular to the direction of harvester 22 travel (FIG. 6a).

Another variable is the direction of rotation of the scraper/brush. In a particular embodiment, it has been found to be advantageous to rotate the scraper/brush in a direction counter to the direction of harvester travel. This direction serves to lift the material to be harvested into the vacuum stream of the harvester, which facilitates harvesting.

The pattern of eddy currents induced by harvesting with a notched scraper/brush 504 has the further advantage of causing a desirable mixing effect, which allows a particular contaminant increased opportunity to contact the algae. It may be appreciated by one skilled in the art that the speed of the water flowing down the floway changes the resonant frequency, size, and rotational speed of the eddies. Thus the actual size and depth of the channel zone of harvest will depend on several factors, such as algal turf community, water speed, depth, harvest interval, and complex dynamic conditions that may be created by changing the residual crop tissue mass, speciation, or dominance of the algal turf community.

As shown in FIGS. 3c and 3d, a bidirectional vacuum nozzle 36 may be actuated by a pressurized liquid system or other means that is brought into close association with the growing substrate in order that desirable quantities of mature algal turf can be more completely removed as previously described.

Figure 4A:
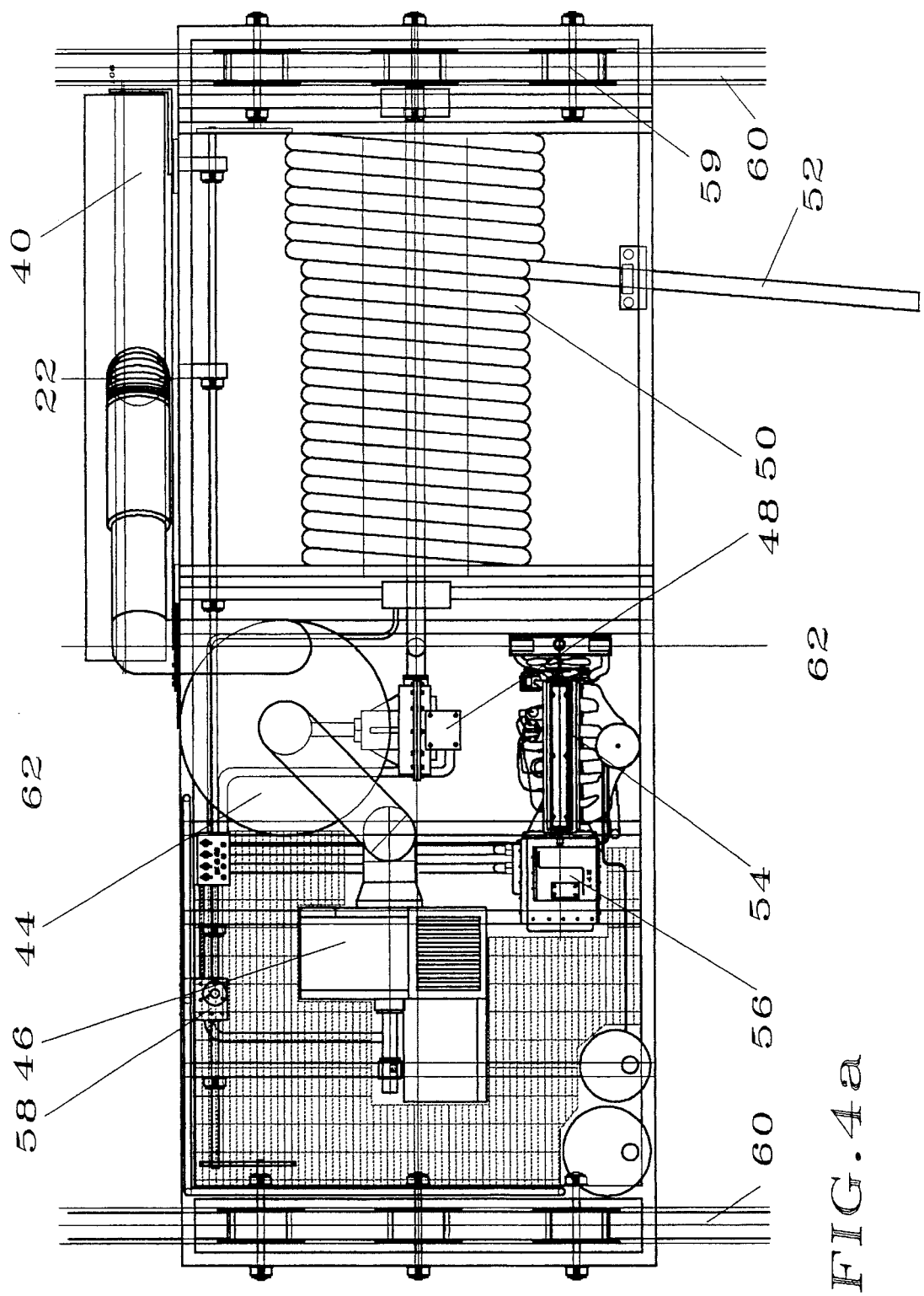
FIG. 4a is a plan view of a harvester in accordance with this invention.

With specific reference now to FIGS. 4a and 4b, wherein the vacuum pickup or vacuum intake plenum is at 40, is shown a preferred embodiment of an algal turf harvester 22, designed to roll along beams or rails or curbs 60 that are placed in a parallel relationship in a direction coinciding with the direction of flow of the water through the floways 2.

The harvester 22 is preferably powered by an internal combustion engine 54, although in some instances an electric motor powered by a nearby ground installation could be used. As will be noted from FIGS. 4a and 4b, the engine 54 is operatively connected to drive a hydraulic pump 56. The hydraulic pump 56 serves to supply highly pressurized fluid for driving the harvester movement drive motor 58. The drive motor 58 is suitably connected to the wheels 59 designed to drive belt tracks 61 such that they move along the beams or rails 60.

Both directions of harvester travel are used to vacuum harvest the algal turf; that is, the harvester operates bidirectionally. Directional change of the harvester as well as other adjustments in travel speed and tuning the position of vacuum pick up are done by a skilled equipment operator who adjusts controls as needed. The wheels 59 are provided with shoulders on both sides extending beyond the belt surface to the sides of the beam so as to prevent the harvester 22 from becoming derailed.

The hydraulic pump 56 also supplies highly pressurized fluid for driving the pump 48 serving to remove mature algal turf from the floway, and to deliver it to an algal turf harvest slurry transfer hose, depicted as hose reel 50 in FIG. 4a and 4b. This hose is deployed behind the first sector of a given floway, from which algal turf is harvested on the first pass of the harvester, with the hose being rewound upon return of the harvester to its starting place in that particular floway. FIG. 1 delineates this evolution taking place in two passes along a floway, one forward and one back, although this two-pass, two-sector floway is not intended as a limitation.

With regard to the means provided by which the harvest vehicle is caused to move along the floway rails, FIG. 4a depicts fluid-powered motor 58, which rotates a shaft drive system with intermittent low-friction bearings to accomplish this conveyance of the harvester.

Also powered with pressurized fluid supplied from the hydraulic pump 56 are vacuum blower 46 and the vacuum pickup 40. Vacuum intake or vacuum intake plenum 40, typically of the type depicted in FIGS. 3c and 3d, is a bidirectional pickup, comprising a horizontally oriented cylinder with a slot at the bottom, although other shapes can be utilized with or without rotating or stationary scraper/brushes. The intake 40 is placed such that vacuum principles as previously described can be optimized. This vacuum intake plenum device or vacuum pickup arrangement causes the algal turf to be detached and conveyed from the growing surface to the separator 44.

As to other pickup details, in the illustrated embodiment, the vacuum pickup 40 is equipped with suitable means of actuation both about the axis of the cylinder for 10–45 degrees (see FIGS. 3c and 3d) and laterally in the direction of the cylinder axis via a track and wheeled mechanism 41 so that it can be moved via hydraulic motor and chain from one side to the other side of the harvester, in order that the algal turf community on both sectors of a given floway can be harvested. This is also referred to as the relocation mechanism of the intake plenum. It is to be noted from FIG. 4a and 4b that a ghosted location 42 is used to indicate the movement of the intake plenum or vacuum pickup 40 that is possible in accordance with this arrangement.

The cross-sectional area of the separator 44 is considerably larger than the area of the duct from the pickup 40, and this causes a drop in air velocity, which effects the separation of the liquid algal turf harvest slurry from the air previously conveying the slurry. The air continues to the vacuum blower 46 through the duct shown and is exhausted upward through the blower outlet 47. The blower 46 is visible in FIGS. 4a and 4b and may, for example, be a Chicago Blower model Lo 15 single-inlet, self-cleaning, reverse-inclined, radial tip, heavy-duty, vacuum blower, which is driven by a suitable hydraulic motor. There are many other manufacturers, types, and sizes of suitable blowers that may be utilized on the harvester 22, and such blowers could be powered by various means.

The harvest slurry picked up by the vacuum pickup or intake plenum 40 enters the separator 44, which separates air from the algal turf harvest slurry. The slurry then falls by gravity to the cone-shaped bottom 45 of the separator (FIG. 4b). From this location the slurry is conveyed by pump 48 into the harvest slurry transfer hose stored on hose reel 50. This hose reel is configured with a swivel fitting 49 at the inlet such that it can effect transfer of algal turf harvest slurry from pump 48 during deployment and rewinding evolutions. The hose reel 50 may have an indexer 52 to ensure orderly placement of the hose on the reel, and the reel is equipped with a pressurized fluid or other means of restraint 55 from unwanted movement during flow variation of pump 48 or movement of the harvest vehicle along the floway path and to wind the hose back on the reel during the return pass back to the harvest starting point at the outflow weir as previously discussed.

The end of the hose 52 is plumbed to a harvest barge 24 or to a similar storage or processing location some varying distance from the moving harvester. This collection point can optionally be equipped with a suction pump to enhance flow through the transfer hose.

The harvest barge 24 may be operatively utilized upon outflow canal 15 (FIG. 1). The harvest barge 24 may serve many purposes, such as to contain and convey the considerably heavy algal turf harvest through buoyant means to a collection site and to make possible a relocation of the harvester from floway to floway such that one harvester can harvest a large number of floways. Additionally, on-barge processing of algal turf, such as further dewatering, drying, and packaging for specialized uses, may be carried on in many instances. Such uses include soil additives, fertilizer, human food, animal feed, cosmetic and pharmaceutical products, and related industrial products.

A remotely powered motor via reeled cable or a motor generator set could be used in lieu of the engine hydraulic combination to drive components on the harvester.

The moving harvester 22 with an onboard spool of hose can feed out hose as the harvester moves along a floway to collect the algal turf harvest from the growing surface. By the use of the harvester, the operator can remove mature algal turf from one half of the width of the floway 2 during initial travel in one direction, and then remove mature algal turf from the other half of the floway during the return trip. The invention is not limited to a floway being divided into only two longitudinal sectors, for four or six or possibly even larger number of sectors could be utilized.

The hose may be fed out as the harvester moves away from the barge, and then retrieved on the return trip, as the harvester moves back toward the barge. It is undesirable for the hose to be deployed over an unharvested floway sector, as this would break up and dislodge the algal turf, effecting harvest completeness.

As previously discussed, the harvesting barge serves not only to collect and store the heavy harvested algal turf slurry and transport it via the outflow canal to a collective storage location, but it is also equipped with means of lifting and moving the self-powered harvester from one floway to another floway so that harvesting of algal turf can be accomplished on multiple floways by the use of only a single harvester vehicle.

In normal practice, it is highly desirable in the instance of a large installation to subdivide the algal turf farm longitudinally into multiple floways, each with at least two sectors. As depicted in FIG. 1, numerous floways extend at right angles to inflow canal 11, with an outflow canal 15 being disposed at the ends of these floways. These individual floways can be created by the use of separating walls or curbs extending substantially the entire distance between the inflow canal 11 and the outflow canal 15.

Figure 10:
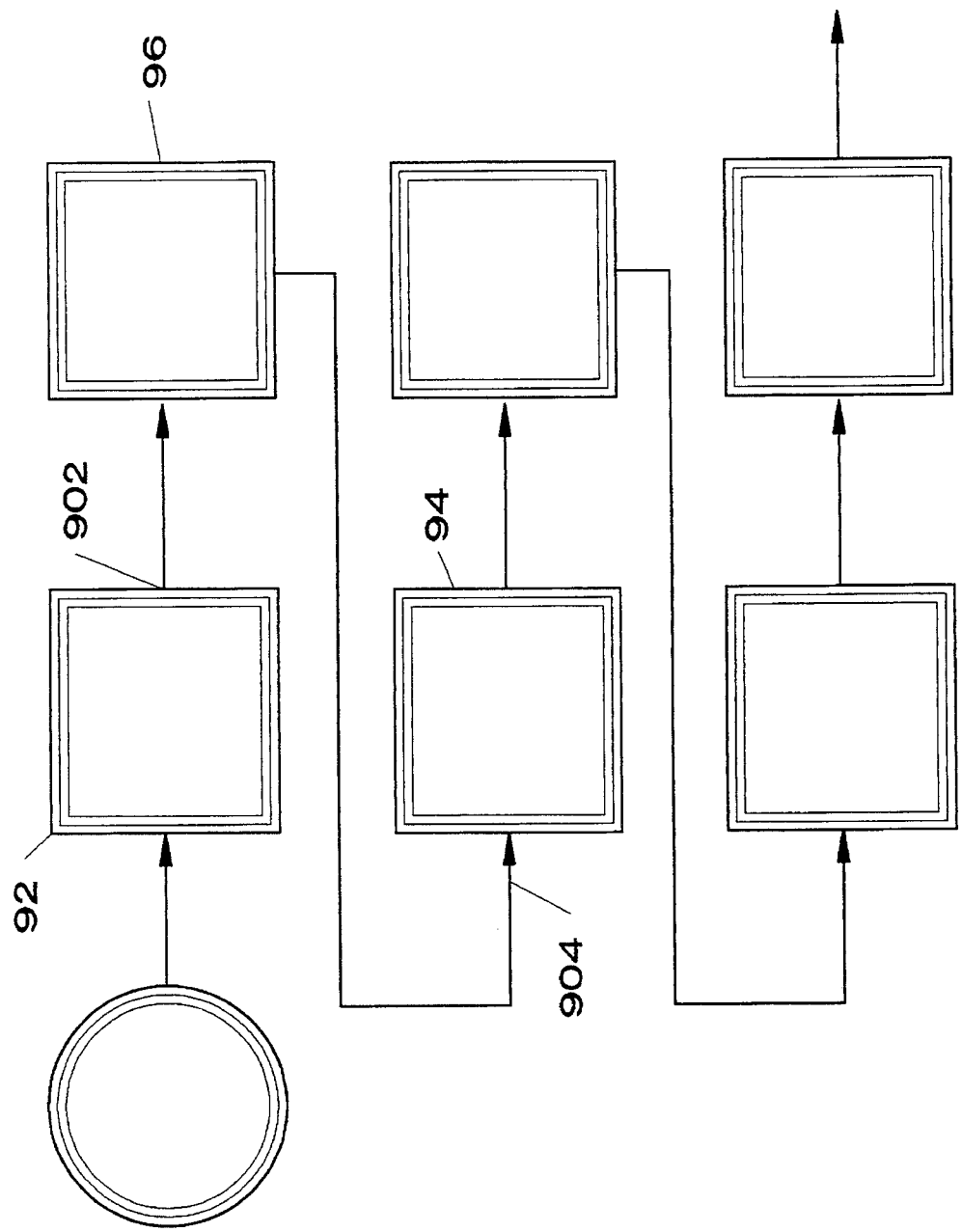
FIG. 10 is a diagram of a serial floway system.

Floways may also be constructed in series of two or more (see FIG. 10), with the outlet 902 of a first floway 92 in fluid communication with the inlet 904 of a second floway 94. Between the floways is positioned a means for cooling the water and/or lowering the pH. Such means may comprise a coarse gravel filter 96, which would cool water passing therethrough. Other means may include a cooling tower or a gas scrubber. Additionally, such means may include a biological means for lowering the pH, such as bacteria that will absorb excess oxygen and release carbon dioxide, which will lower the pH of the water. This filtering preconditions the water for enhanced scrubbing action in the second floway 94.

As mentioned, it is advantageous to restrict inflow during harvesting of a given floway 2, so that harvest water content can be minimized.

It has been found to be beneficial to provide a refuge-type area, or seeding channel 97, at the top of the floway 2 (FIG. 8a,b). This area 97 is harvested less frequently than the remaining portion of the bottom surface to allow highly reproductive plants to reseed the growing surface.

Means are also provided for reseeding the floway surface with a specific catalyst species or mixed assemblage of species (see FIG. 8a,b). This reseeding has been shown to enhance the growth of the algal turf after harvesting, improving the performance of the system. A specific combination is a filamentous alga plus diatoms, which together can grow rapidly. With reference to FIG. 8, material is added to a seeding channel 97 located adjacent inflow weir 973 in floway 98, which has a bottom 975 sloping downward toward outflow weir 974. Seeding channel 97 is delimited at the downstream end by porous reseeding weir 976, having a mesh size dimensioned to permit water to flow therethrough. Large clumps of algal biomass are retained within the weir 976, while small filament strands and algal spores are washed down the floway, where they settle out and attach. An exemplary mesh size is 0.25 in. mesh, with a 0.7 in. pore size.

An algal seed stock may also be added to the floway surface following harvesting to enhance treatment efficiency and maintain species diversity or a dominance of a particular species. This reseeding can be accomplished from the harvester itself.

In order to provide different growing environments for the algal turf, an anaerobic digester 95 is provided (see FIG. 1), typically adjacent the upstream end of the floway 2. A first portion 952 has a first depth 308 that is sufficient to promote aerobic growth.

A second portion 956 is adjacent the upstream end and has a second depth 958 greater than the first depth 308 that is sufficient to promote anaerobic growth.

In use, water is admitted into the floway by the inflow weir 3 and is permitted to flow over the algal turf. The bottom surface first portion 952 of the algal turf serves as a means for aerobically bioassimilating pollutants from the water to be treated, and thereby cleanses the water thereof. The bottom surface second portion 956 of the algal turf serves as a means for anaerobically bioassimilating pollutants from the water to be treated, and thereby cleanses the water thereof. Finally the water is discharged from the ouflow weir 4 in a cleansed condition.

Quite advantageously, the arrangement illustrated in FIG. 1 enables mature algal turf in one section to be harvested by shutting off the water thereto, while permitting the water to continue to flow through the other sector or sectors. The multisector arrangement thus makes it possible for the algal turf farm to operate on a continuous basis, with growth continuing in all the other floways during the time that the algal turf in one or more floways is being harvested in a dewatered state. As should now be apparent, in accordance with one embodiment of this invention, the intake plenum means are movable laterally on the harvester, so as to be selectively positionable in any of several possible positions. Because the floway may be regarded as divided into a plurality of longitudinal sectors, as the harvester moves along the curbs and over the floway, mature algal turf can be harvested from a selected longitudinal sector of the floway, as determined by the lateral positioning of the intake plenum means. On the return trip, the mature algal turf can be harvested from a different longitudinal sector of the floway.

As an alternative to the foregoing embodiment, the intake plenum means may involve the use of at least two intake plenums that are disposed in laterally fixed locations on the harvester, with each intake plenum being relatable to a corresponding longitudinal sector. In order to be able to utilize relatively modest vacuum intake means, it may be preferable to utilize means for selectively activating these several intake plenums, so that not all are operating at the same time. Therefore, as the harvester moves along the curbs and over the floway, mature algal turf can be harvested from each selected longitudinal sector of the floway, as determined by the position of the particular intake plenum.

When using the laterally fixed intake plenums, it may be desirable for the operator to accomplish a slight vertical repositioning of the intake plenums, depending on the particular sector being harvested at a given time. In this way the proper tolerance can be maintained between intake plenum and algal turf growing surface.

Figure 11:
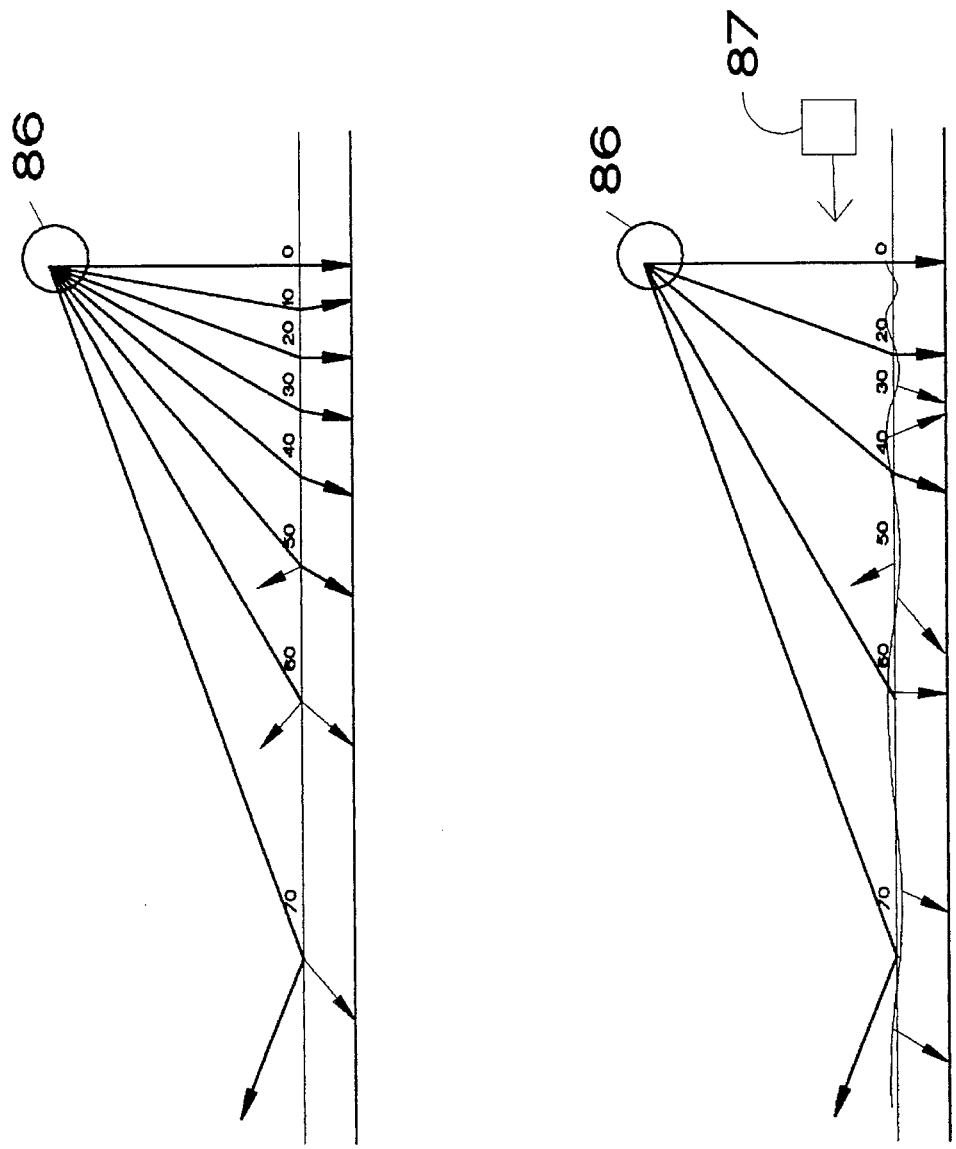
FIG. 11 illustrates the refractive properties of a smooth versus a disturbed water surface.

As indicated earlier, it is known that the cleansing function provided by algal turf is assisted by having the lower algal filaments flashed with light, for this greatly assists photosynthetic action of the plant cells covered by turfs of organisms growing on top of them. To this end, a suitable illumination means 86 is positioned above the water surface for creating a high-intensity source of energy usable by the algae for photosynthesis, enhancing growth potential. To capitalize further on this additional light energy, means 87 are provided to disturb the water surface, permitting the refraction at the water surface to "focus" light onto the algae. As can be seen in FIGS. 11 and 12, waves cause additional light to enter the water, since light at an angle greater than or equal to 60 degrees is largely reflected off the water surface, and waves serve to change the angle of light incidence at the surface. FIG. 12a shows the effect of multiple disturbances on the water surface, with the result of interference patterns on the growing surface, the bright bands having a greater intensity than light passing through an undisturbed surface. FIG. 12b shown the effect of a single disturbance on the water surface, again focusing light in bands on the bottom.

Shading means 99 (FIG. 1) are also provided for shading a portion of the water surface for providing at least two sectors. A first floway sector 992 is subject to available solar illumination, and a second floway sector 994 is subject to shading. The different illumination levels impinging on the first 992 and the second 994 floway sectors are conducive for promoting different algal turf conditions therein, thereby providing different cleansing environments.

Therefore, in use, water is admitted into the floway 2 by the inflow weir 3 and is permitted to flow over the algal turf. The algal turf in the first sector 992 then serves as means for bioassimilating a first pollutant from the water to be treated, and the algal turf in the second sector 994 serves as means for bioassimilating a second pollutant from the water to be treated, thereby cleansing the water of the first and the second pollutant. As previously, the water is then discharged from the ouflow weir 4 in a cleansed condition.

Figure 7A:
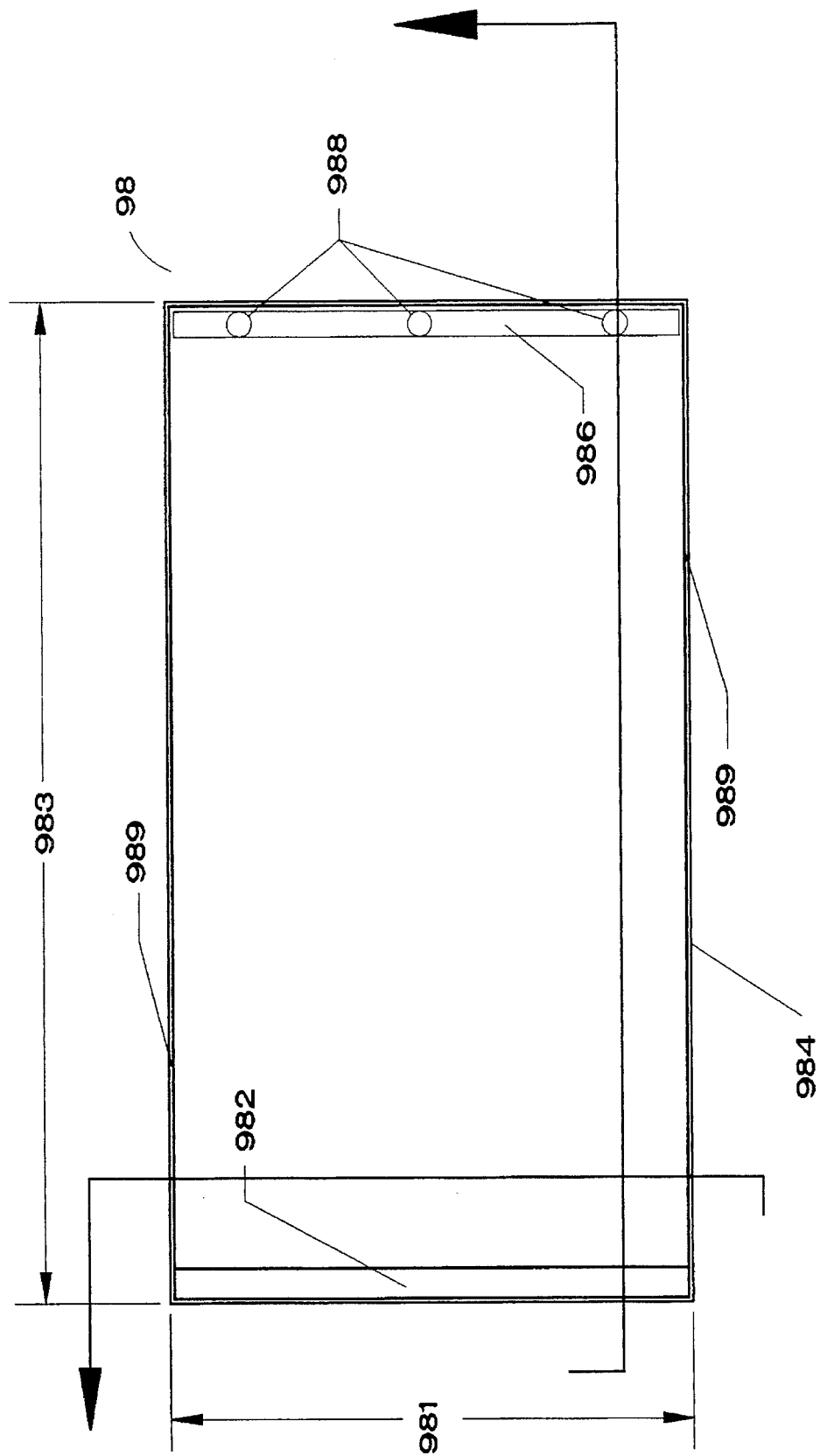
FIG. 7 illustrates (a) a plan view; (b) a longitudinal section; and (c) a transverse section of an ultraviolet reactor for the removal of chlorinated hydrocarbons.
Figure 7B:
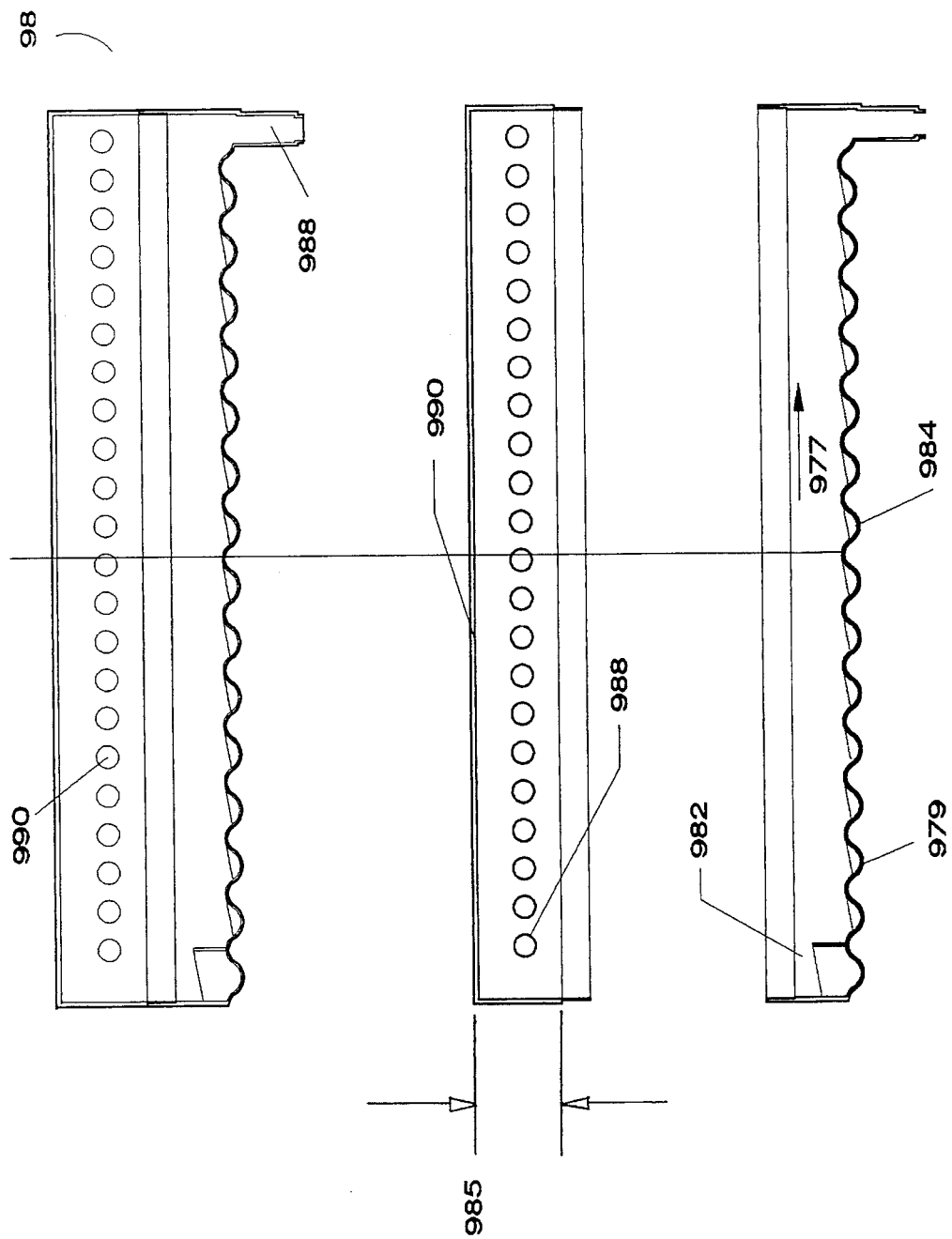
Figure 9:
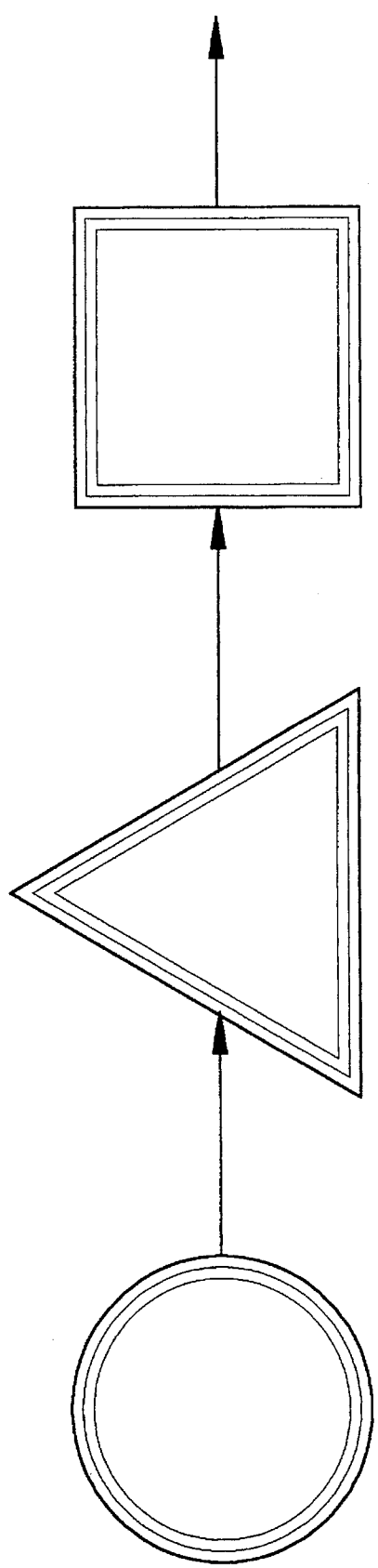
FIG. 9 is a diagram of inflow water pretreatment with calcium phosphate.

A means for degrading volatile organic compounds (VOCs) is also provided, positioned, as shown in FIG. 1, adjacent an outflow weir 4. This means in a preferred embodiment comprises an ultraviolet reactor 98, shown in FIG. 7.

Water exiting from floway 2 flows into inflow manifold trough 982 and into the reactor body, which has sides 989 and a bottom sloping downward from the inflow trough 982 to the outflow trough 986. The water then flows across the bottom surface 984, which in the preferred embodiment comprises a textured and rippled TiO$_2$ foil formed over fiberglass. Finally, the water flows into outflow trough 986, and empties out through the drains 988. Supported above the flowing water between inflow 982 and outflow troughs 986 are ultraviolet lights 988 affixed beneath a sealed enclosure lamp hood 990.

In an exemplary embodiment, reactor 98 has a width 981 between 1 and 40 ft, a length 983 between 4 and 50 ft, and a sidewall height 985 between 4 and 60 in. Ripple heights 979 may be between 0.5 and 12 in., and the bottom slope 977 between 0.5 and 30%.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of the preferred embodiment thereof, and the advantageous new and useful results obtained thereby, the new and useful constructions, and reasonable mechanical equivalents thereof obvious to those skilled in the art, are set forth in the appended claims.

What is claimed is:

1. A floway for cleansing low-pH water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

means for adding calcium phosphate at the upstream end;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end and having a generally downward slope from the upstream end to the downstream end, the bottom surface having a texture conducive for growing a bed of algae to form an algal turf;

wherein, in use, water is admitted into the floway by the admitting means, is permitted to flow over the algal turf, the algal turf serving as means for bioassimilating pollutants from the water to be treated and thereby cleansing the water, and is discharged by the discharging means in a cleansed condition; and wherein, in use, the calcium phosphate added at the upstream end causes the pH to rise, permitting algae growth, and further provides nutrient phosphorus to the algae.

2. A floway for cleansing water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway;

a water-impervious bottom surface disposed between the curb means and extending from the upstream end to the downstream end and having a generally downward slope from the upstream end to the downstream end, the bottom surface having a texture conducive for growing a bed of algae to form an algal turf; and means for disturbing the water surface for changing the angle of incidence of light on the water surface, thereby permitting the proportion of light entering the water to rise, increasing the amoung of light reaching the algal turf, and enhancing growth of the algal turf;

wherein, in use, water is admitted into the floway by the admitting means, is permitted to flow over the algal turf, the algal turf serving as means for bioassimilating pollutants from the water to be treated and thereby cleansing the water, and is discharged by the discharging means in a cleansed condition.

3. The floway recited in claim 2, further comprising illumination means positioned above the water surface for providing additional light energy to the algae, thereby enhancing algal turf growth.

4. A series of floways for cleansing water of pollutants, the series of floways comprising:

a first and a second floway, each floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end and having a generally downward slope from the upstream end to the downstream end, the bottom surface having a texture conducive for growing a bed of algae to form an algal turf;

means for directing water from the discharging means of the first floway to the admitting means of the second floway; and means for preconditioning water positioned in the flow path between the first and the second floways for enhancing the cleansing action of the second floway;

wherein, in use, water is admitted into the first floway by the admitting means, is permitted to flow over the algal turf in the first floway, the algal turf serving as means for bioassimilating pollutants from the water to be treated and thereby cleansing the water, is discharged by the discharging means of the first floway in a cleansed condition, is preconditioned in order to optimize conditions of the water for cleansing by the second floway, is directed to and enters the admitting means of the second floway, is permitted to flow over the algal turf in the second floway, and is discharged by the discharging means of the second floway in a further cleansed condition.

5. The floway recited in claim 4, wherein the preconditioning means comprises means for lowering the pH of the water.

6. The floway recited in claim 4, wherein the preconditioning means comprises means for cooling the water.

7. An algal turf farm system for cleansing water of pollutants, the farm comprising:

a floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end and having a generally downward slope from the upstream end to the downstream end, the bottom surface having a texture conducive for growing a bed of algae to form an algal turf; and a harvester for harvesting mature algal turf having vacuum means for removing mature algae from the bottom surface and for leaving behind algal turf roots on the bottom surface for regrowth, the vacuum means comprising a scraper element having notches having a size and spacing tailored for a specific site to partially remove a desired amount of turf, thereby providing strips of unharvested turf that can reproduce into harvested turf regions and enhancing postharvest regrowth;

wherein, in use, water is admitted into the floway by the admitting means, is permitted to flow over the algal turf, the algal turf serving as means for bioassimilating pollutants from the water to be treated and thereby cleansing the water, and is discharged by the discharging means in a cleansed condition.

8. The algal turf farm system recited in claim 7, wherein the bottom surface texture and the size and spacing of the notches in the scraper element are optimized to cooperatively enhance the destruction of unwanted organisms during harvesting and to tailor a degree of algal harvest.

9. The algal turf farm system recited in claim 7, wherein the scraper element is rotatable during harvesting for achieving a turf thinning.

10. A floway for cleansing water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end and having a generally downward slope from the upstream end to the downstream end, the bottom surface having a texture conducive for growing a bed of algae to form an algal turf;

wherein, in use, water is admitted into the floway by the admitting means, is permitted to flow over the algal turf, the algal turf serving as means for bioassimilating pollutants from the water to be treated and thereby cleansing the water, and is discharged by the discharging means in a cleansed condition;

wherein, in use, mature algal turf is harvested at predetermined intervals to permit periodic regrowth and renewed bioassimilation potential; and wherein the floway further comprises means for reseeding the algal turf with a desired algal species for enhancing regrowth after harvesting.

11. A floway for cleansing water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end and having a generally downward slope from the upstream end to the downstream end, the bottom surface having a texture conducive for growing a bed of algae to form an algal turf, the bottom surface comprising a channel at the upstream end and a remaining portion;

wherein, in use, water is admitted into the floway by the admitting means, is permitted to flow over the algal turf, the algal turf serving as means for bioassimilating pollutants from the water to be treated and thereby cleansing the water, and is discharged by the discharging means in a cleansed condition;

wherein, in use, mature algal turf is harvested from the remaining portion of the bottom surface at predetermined intervals to permit periodic regrowth and renewed bioassimilation potential; and wherein the channel, in use, is harvested less frequently than the remaining portion, thereby permitting species growing in the channel to reseed the remaining portion after the remaining portion is harvested.

12. A method for controlling an undesirable microorganism population level in an algal turf floway, the method comprising the steps of:

providing a floway having an upstream end, a downstream end, a length, a width, a water-impervious bottom surface having a texture conducive for growing a bed of algae to form an algal turf, and a pair of spaced-apart curb means extending in a generally parallel fashion longitudinally between the upstream end and the downstream end for defining the sidewalls of the floway;

growing an algal turf on the bottom surface, the algal turf comprising and algal species and an undesirable microorganism population;

discharging water from the downstream end of the floway;

harvesting mature algal turf from the bottom surface of the floway; and permitting the culture surface to dry for a time sufficient to significantly reduce the population level of the undesirable microorganism but insufficient to eradicate the algal species in the algal turf.

13. A floway for cleansing water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway;

a water-impervious bottom surface disposed between the curb means and extending from the upstream end to the downstream end and having a generally downward slope from the upstream end to the downstream end, the bottom surface having a texture conducive for growing a bed of algae to form an algal turf; and means for shading a portion of the water surface for providing at least two sectors comprising a first sector subject to available solar illumination and a second sector subject to shading, the different illumination levels impinging on the first and the second sectors conducive for promoting different algal turf conditions therein, thereby providing different cleansing environments;

wherein, in use, water is admitted into the floway by the admitting means, is permitted to flow over the algal turf, the algal turf in the first sector serving as means for bioassimilating a first pollutant from the water to be treated, the algal turf in the second sector serving as means for bioassimilating a second pollutant from the water to be treated, thereby cleansing the water of the first and the second pollutant, and is discharged by the discharging means in a cleansed condition.

14. A floway for cleansing water of pollutants, the floway having an upstream end, a downstream end, a length, and a width and comprising:

means for admitting water to be treated at the upstream end, the admitting means movable between an open position and a closed position;

means for discharging treated water at the downstream end, the discharging means movable between an open position and a closed position;

a pair of spaced-apart curb means extending in a generally parallel fashion longitudinally between the admitting means and the discharging means for defining the sidewalls of the floway, the distance between the curb means comprising the width of the floway; and a water-impervious bottom surface disposed between the curb means and extending from the upstream end to the downstream end, the bottom surface having:

a generally downward slope from the upstream end to the downstream end;

a texture conducive for growing a bed of algae to form an algal turf;

a first portion adjacent the upstream end having a first depth, the first depth sufficient to promote aerobic growth;

a second portion adjacent the upstream end having a second depth greater than the first depth, the second depth sufficient to promote anaerobic growth;

wherein, in use, water is admitted into the floway by the admitting means, is permitted to flow over the algal turf, the bottom surface first portion of the algal turf serving as means for aerobically bioassimilating pollutants from the water to be treated and thereby cleansing the water thereof and the bottom surface second portion of the algal turf serving as means for anaerobically bioassimilating pollutants from the water to be treated and thereby cleansing the water thereof, and is discharged by the discharging means in a cleansed condition.

* * * * *